United States Patent
Sasson et al.

(10) Patent No.: US 10,717,664 B2
(45) Date of Patent: Jul. 21, 2020

(54) PHOTOCATALYSTS BASED ON BISMUTH OXYHALIDE, PROCESS FOR THEIR PREPARATION AND USES THEREOF

(71) Applicant: YISSUM RESEARCH DEVELOPMENT COMPANY OF THE HEBREW UNIVERSITY OF JERUSALEM LTD., Jerusalem (IL)

(72) Inventors: Yoel Sasson, Jerusalem (IL); Hani Gnayem, Baqa-El Gharbia (IL)

(73) Assignee: YISSUM RESEARCH DEVELOPMENT COMPANY OF THE HEBREW UNIVERSITY OF JERUSALEM LTD., Jerusalem (IL)

(*) Notice: Subject to any disclaimer, the term of this patent is extended or adjusted under 35 U.S.C. 154(b) by 1101 days.

(21) Appl. No.: 14/910,202

(22) PCT Filed: Aug. 4, 2014

(86) PCT No.: PCT/IL2014/050702
§ 371 (c)(1),
(2) Date: Feb. 4, 2016

(87) PCT Pub. No.: WO2015/019348
PCT Pub. Date: Feb. 12, 2015

(65) Prior Publication Data
US 2016/0167991 A1    Jun. 16, 2016

Related U.S. Application Data

(60) Provisional application No. 61/862,101, filed on Aug. 5, 2013, provisional application No. 62/007,946, filed on Jun. 5, 2014.

(51) Int. Cl.
B01J 35/04    (2006.01)
C02F 1/72    (2006.01)
(Continued)

(52) U.S. Cl.
CPC .............. *C02F 1/725* (2013.01); *B01J 27/06* (2013.01); *B01J 27/08* (2013.01); *B01J 35/002* (2013.01);
(Continued)

(58) Field of Classification Search
CPC ........ B01J 35/004; B01J 37/031; B01J 37/16; B01J 27/08; B01J 35/002; B01J 27/06;
(Continued)

(56) References Cited

U.S. PATENT DOCUMENTS 4,252,570 A * 2/1981 Shannon ................ B82Y 30/00
106/479
6,610,204 B1    8/2003 Kroon et al.
(Continued)

FOREIGN PATENT DOCUMENTS

CN    101455973    6/2009
CN    101786006    7/2010
(Continued)

OTHER PUBLICATIONS

WO-2012066545-A2, May 2012; Shenawi-Khalil Sanaa English translation (Year: 2012).*
(Continued)

*Primary Examiner* — Cameron J Allen
(74) *Attorney, Agent, or Firm* — Nixon & Vanderhye P.C.

(57) ABSTRACT

The invention provides a process for the preparation of bismuth oxyhalide, comprising a precipitation of bismuth oxyhalide in an acidic aqueous medium in the presence of a reducing agent. Also provided are bismuth oxyhalide compounds doped with elemental bismuth $Bi^{(0)}$. The use of $Bi^{(0)}$ doped bismuth oxyhalide as photocatalysts in water purification is also described.

12 Claims, 19 Drawing Sheets

(51) Int. Cl.
| | |
|---|---|
| *B01J 35/00* | (2006.01) |
| *C01G 29/00* | (2006.01) |
| *B01J 37/03* | (2006.01) |
| *B01J 37/16* | (2006.01) |
| *B01J 27/08* | (2006.01) |
| *B01J 27/06* | (2006.01) |
| B01J 37/02 | (2006.01) |
| B01J 37/10 | (2006.01) |
| C02F 101/36 | (2006.01) |
| C02F 101/30 | (2006.01) |
| C02F 101/34 | (2006.01) |
| B01J 35/10 | (2006.01) |

(52) U.S. Cl.
CPC .......... *B01J 35/004* (2013.01); *B01J 37/031* (2013.01); *B01J 37/16* (2013.01); *C01G 29/00* (2013.01); *C01G 29/006* (2013.01); B01J 35/0013 (2013.01); B01J 35/0033 (2013.01); B01J 35/1014 (2013.01); B01J 37/0221 (2013.01); B01J 37/10 (2013.01); C01P 2002/50 (2013.01); C01P 2002/54 (2013.01); C01P 2002/72 (2013.01); C01P 2002/85 (2013.01); C01P 2004/03 (2013.01); C01P 2004/30 (2013.01); C01P 2004/32 (2013.01); C01P 2004/61 (2013.01); C01P 2006/12 (2013.01); C02F 2101/30 (2013.01); C02F 2101/308 (2013.01); C02F 2101/345 (2013.01); C02F 2101/36 (2013.01); C02F 2305/10 (2013.01)

(58) Field of Classification Search
CPC .... B01J 37/10; B01J 37/0221; B01J 35/0013; B01J 35/0033; B01J 35/1014; C01G 29/00; C01G 29/006; C02F 1/725; C02F 2101/308; C02F 2101/345; C02F 2101/36; C02F 2305/10; C02F 2101/30; C01P 2002/50; C01P 2002/54; C01P 2002/72; C01P 2002/85; C01P 2004/03; C01P 2004/30; C01P 2004/32; C01P 2004/61; C01P 2006/12
See application file for complete search history.

(56) References Cited

U.S. PATENT DOCUMENTS

2005/0203312 A1* 9/2005 Pessoa Cavalcanti ....................... B01J 23/002
562/546
2010/0230601 A1* 9/2010 Martins Loureiro ....................... C09K 11/772
250/361 R

FOREIGN PATENT DOCUMENTS

| CN | 103101974 | | 5/2013 | |
| CN | 103421511 A | * | 12/2013 | ............ C09K 11/86 |
| EP | 0 667 181 | | 8/1995 | |
| GB | 119659 | | 9/1919 | |
| WO | WO 2012/066545 | | 5/2012 | |
| WO | WO-2012066545 A2 | * | 5/2012 | ............ B01J 27/08 |

OTHER PUBLICATIONS

CN-103421511-A translation, Han Jin entire document (Year: 2013).*
Chinese Office Action issued in App. No. 201480043734.6 dated Sep. 27, 2016 (w/ translation).
Weng et al., "Facile in situ synthesis of a Bi/BiOCL nanocomposite with high photocatalytic activity," *Journal of Materials Chemistry A*, vol. 1: 3068-3075 (2013).
International Search Report for PCT/IL2014/050702, dated Mar. 10, 2015, 6 pages.
Written Opinion of the ISA for PCT/IL2014/050702, dated Mar. 10, 2015, 6 pages.
Zhang et al., J. "Generalized One-Pot Synthesis, Characterization, and Photocatalytic Activity of Hierarchical BiOX (X=Cl, Br, I) Nanoplate Microspheres", J. Phys. Chem. C, vol. 112, (2008) pp. 747-753.
Zhang et al.,"$Fe_3O_4$ coupled BiOCl: A highly efficient magnetic photocatalyst", Applied Catalysts B: Environmental, vol. 90, No. 3-4, Aug. 17, 2009, pp. 458-462.
Yu et al., "A Bi/BiOCl heterojunction photocatalyst with enhanced electron-hole separation and excellent visible light photodegrading activity", Journal of Materials Chemistry A, vol. 2, pp. 1677-1681 (2014).
Atkins, "Standard Electrode Potentials Table" *Physical Chemistry*, 3$^{rd}$ Edition, Oxford University Press, p. 825 (1986).
Sun et al., "$BiOCl_xBr_yI_z$ (x+y+z=1) solid solutions with controllable band gap and highly enhanced visible light photocatalytic performances" *Journal of Alloys and Compounds*, vol. 638: 254-260 (2015).

* cited by examiner

☒ Type: 2Th/Th locked - Start: 4.997 ° - End: 76.998 ° - Step: 0.020 ° - Step time: 1. s - Anode: Cu - WL1: 1.5406 WL2: 1.54439 -

☒ Type: 2Th/Th locked - Start: 4.997 ° - End: 76.998 ° - Step: 0.020 ° - Step time: 1. s - Anode: Cu - WL1: 1.5406 - WL2: 1 Cu - WL1: 1.5406 - WL2: 1

☒ 04-007-4915 (A) - Bismoclite, syn - BiClO - WL: 1.5406 - Tetragonal - a 3.88851 - b 3.88851 – c 7.37848 - alpha 90.000 - beta 90.000 - gamma 90.000 - Primitive – P4/nmm (129) - 2 - 111.566 - I/Ic ☒ Type: 2Th/Th locked - Start: 5.011 ° - End: 77.008 ° - Step: 0.020 ° - Step time: 1. s - Anode: Cu - WL1: 1.5

☒ Type: 2Th/Th locked - Start: 5.031 ° - End: 77.008 ° - Step: 0.020 ° - Step time: 1. s - Anode: Cu -

☐ 04-007-4915 (A) - Bismoclite, syn - BiClO - WL: 1.5406 - Tetragonal - a 3.88664 - b 3.88664 - c 7.37952 – alpha 90.000  beta 90.000 - gamma 90.000 - Primitive – P4/nmm (129) - 2 - 111.475 - I/Ic ■ II - BiOBr (a) - File: II - BiOBr (a).raw - Type: 2Th/Th locked - Start: 5.000 ° - End: 75.000 ° - Step: 0.020 °
Step time: 1. s - Temp.: 25 °C (Room) - Time Started: 9 s - 2-Theta: 5.000 ° - Theta: 2.500 ° - Chi: 0.00 °

■ 04-008-7926 (A) - Bismuth Bromide Oxide - BiBrO - Y: 50.00 % - d x by: 1. - WL: 1.5406 - Tetragonal –
a 3.92330 - b 3.92330 - c 8.10500 - alpha 90.000 - beta 90.000 - gamma 90.000 - Primitive - P4/nmm (129)

PHOTOCATALYSTS BASED ON BISMUTH OXYHALIDE, PROCESS FOR THEIR PREPARATION AND USES THEREOF

This application is the U.S. national phase of Intentional Application No. PCT/IL2014/050702 filed 4 Aug. 2014, which designated the U.S. and claims the benefit of U.S. Provisional Application Nos. 61/862,101 filed 5 Aug. 2013, and 62/007,946 filed 5 Jun. 2014, the entire contents of each of which are hereby incorporated by reference.

Compounds exhibiting photocatalytic activity are capable of accelerating oxidation reactions in response to light irradiation and are hence potentially useful in decomposing organic contaminants present in water. The $TiO_2$ powder manufactured by Degussa Corporation under the name P-25 is an example of a commercially available photocatalyst.

Bismuth oxyhalides of the formula BiOHal, wherein Hal indicates halogen atom, are known in the art for use in the photocatalysis of oxidation reactions of organic matter under light irradiation. For example, Zhang et al. [J. Phys. Chem. C 112, p. 747-753 (2008)] reported the hydrothermal synthesis of BiOHal powders, by mixing together bismuth nitrate and an alkali halide salt (e.g., KCl, NaBr or KI) in ethylene glycol as a solvent. The mixture was then subjected to hydrothermal procedure in an autoclave at 160° C. for 12 hours. The crystalline product collected was in the form of microspheres consisting of nanoplates.

Co-assigned WO 2012/066545 describes the preparation and characterization of mixed bismuth oxyhalide compounds of the formula $BiOCl_yBr_{1-y}$, which were obtained in the form of fairly spherical particles with an organized flower-like microstructure consisting of individual thin plates arranged radially in a petal-like manner. The mixed bismuth oxyhalide compounds were prepared by mixing a bismuth salt and quaternary ammonium chloride and bromide salts in an acidic environment.

Zhang et al. [Applied Catalysts B: Environmental, Vol. 90 Issue 3-4, p. 458-462 (2009)] reported the synthesis of magnetic photocatalyst, $Fe_3O_4$/BiOCl nanocomposite, where the $Fe_3O_4$ nanocrystals are inlaid in the BiOCl matrix flake.

Yu et al. [Journal of Materials Chemistry A, 2, 1677-1681 (2014)] reported the synthesis of BiOCl by mixing bismuth nitrate and cetyltrimethylammonium bromide (CTAB) in ethanol. A slurry was formed, following which hydrochloric acid was added dropwise. The mixture was subjected to hydrothermal treatment for three hours at 180° C.

We have found that the addition of a reducing agent to an acidic aqueous reaction mixture comprising bismuth ions and halide salts, especially quaternary ammonium chloride and bromide salts, results in the reduction of some $Bi^{3+}$ ions to afford $Bi^{(0)}$ doped-bismuth oxyhalide catalysts with enhanced catalytic activity. The experimental results reported below indicate that under light irradiation, the compounds of the invention are highly effective in purifying water contaminated with organic compounds. For example, an organic contaminant such as chlorobenzene is fully oxidized to carbon dioxide in the presence of the compound of the invention following short exposure period to light irradiation.

Accordingly, one aspect of the invention is a process comprising a precipitation of bismuth oxyhalide in an acidic aqueous medium in the presence of a reducing agent. More specifically, the process comprises combining in an acidic aqueous medium at least one bismuth salt, at least one halide source and a reducing agent, and isolating a bismuth oxyhalide precipitate. It should be noted that by the term "aqueous medium" is not meant that the reaction medium in question consists solely of water. Water-miscible organic solvents may be present in the reaction mixture. For example, an organic acid such as glacial acetic acid is preferably used for generating the acidity and ethanol could be added to the reaction mixture to act as a defoamer, as explained below. Water preferably constitutes at least 30% (v/v) of the total volume of the liquid medium where the reaction takes place, e.g., between one third and two thirds of the total volume.

Optionally, a secondary metal ion $M^{p+}$, wherein p is an integer equal to or greater than 1, and preferably equal to or greater than 2, e.g., trivalent or quadrivalent metal ion, may be added to the reaction mixture, for example, $Fe^{3+}$.

The process set forth above is preferably carried out by charging a reaction vessel with water and an acid and dissolving the bismuth salt in the acidic environment. The resultant solution is then combined with a source of halide ion to form a reaction mixture, followed by the addition of a reducing agent to said reaction mixture. The pH of the reaction mixture is preferably less than 4, and even more preferably less than 3.5, e.g., from 2.5 to 3, and more specifically around 3.

A bismuth salt suitable for use in the process of the invention is a bismuth compound which decomposes under acidic environment to release bismuth ions. To this end, bismuth compounds, such as bismuth nitrate $(Bi(NO_3)_3 \cdot 5H_2O)$ or bismuth oxide $(Bi_2O_3)$ are suitable for use, with bismuth nitrate being especially preferred.

The bismuth salt is dissolved in an acidic medium which is preferably generated by means of an organic acid or an aqueous solution of an organic acid such as glacial acetic acid or formic acid. The dissolution of the bismuth salt can be easily accomplished at room temperature (e.g., between 20° C. and 30° C.) under stirring.

The halide source(s), for example, chloride or bromide or both is preferably selected from the group consisting of quaternary ammonium chloride and bromide salts. Preferred salts are represented by the formulas $N^+R_1R_2R_3R_4Cl^-$ and $N^+R_1R_2R_3R_4Br^-$, wherein $R_1$, $R_2$, $R_3$ and $R_4$ are alkyl groups, which may be the same or different. For example, $R_1$, $R_2$ and $R_3$ are short chain alkyl groups (e.g., methyl groups) and $R_4$ is a long straight or branched alkyl chain, preferably a straight chain consisting of not less than 12 carbon atoms (e.g., not less than 16 carbon atoms). For example, halide sources which can be suitably used are selected from the group consisting of cetyltrimethylammonium bromide (abbreviated CTAB), cetyltrimethylammonium chloride (abbreviated CTAC), tetrabutylammonium chloride (abbreviated TBAC) and tetrabutylammonium bromide (abbreviated TBAB). The cationic surfactants described above (e.g., CTAB and CTAC) appear to function as Structure Directing Agents—SDAs, affecting the morphological structure of the resultant compounds, as discussed below. However, it should be noted that metal halide salts such as alkali halides (e.g., NaCl, KBr) can also be used as halide sources.

The presence of a secondary metal ion $M^{p+}$, such as $Fe^{3+}$, is not mandatory. Ferric compounds which can be used include ferric nitrate $Fe(NO_3)_3 \cdot 6H_2O$ and salts of the formula $AFe(SO_4)_2 \cdot 12H_2O$ wherein A indicates a unipositive cation such as alkali or ammonium.

When two organic halide salt(s) are used to form a mixed bismuth oxyhalide, they can be added either simultaneously or in succession to the bismuth-containing acidic solution. The halide salts can be employed in a solid form or more preferably, in the form of separate or combined aqueous or alcoholic solutions. For example, when the reaction is carried out also in the presence of $Fe^{3+}$ source, one convenient order of addition involves the premixing of organic halide(s) and ferric salts in water, followed by the addition of the acidic bismuth-containing solution to form a reaction mixture.

The concentration of the bismuth salt in the acidic reaction mixture is preferably from 0.02 M up to saturation limit, for example from 0.05 to 0.5 M. When a mixture of water and a liquid organic acid is used, then the volumetric ratio between the aqueous and organic components is preferably from 2:1 to 1:2, e.g., around 1:1. The chloride or bromide salts are used in stoichiometric amounts relative to the bismuth source, or in a slight molar excess. If ferric ions are added, then the molar ratio between the bismuth and ferric ions is preferably in the range from 200:1 to 100:5, for example, around 100:1.

As already mentioned above, the process of the invention relates also to the precipitation of a mixed bismuth oxyhalide, e.g., chloride-bromide bismuth oxyhalides. To this end, the precipitation reaction takes place in the presence of different halides, e.g., chloride and bromide sources, with the molar ratio chloride/bromide being adjusted to give the desired $BiOCl_yBr_{1-y}$ compound, where y is greater than 0.5, e.g., from 0.5 to 0.95, e.g., from 0.6 to 0.95, preferably from 0.7 to 0.95. Preferably, the amounts of the chloride and bromide salts are adjusted to form the mixed $BiOCl_yBr_{1-y}$ compound in which the ratio y/1-y is not less than 2:1, and preferably from 3:1 to 8:1, inclusive.

On combining a bismuth salt and one or more quaternary ammonium halide salts(s) under acidic conditions, bismuth oxyhalide begins to crystallize almost instantaneously to give spherical particles with flower-like morphology, composed of 'leaves' that are interconnected to form cells or channels which open onto the external surface of the spheres. Without wishing to be bound by theory, it is believed that in the presence of a reducing agent, some $Bi^{3+}$ ions undergo a reduction reaction which starts almost concurrently with the precipitation reaction. This reduction reaction presumably takes place within the open cells and channels of the bismuth oxyhalide particles, incorporating bismuth metal as a dopant into the bismuth oxyhalide particles, thereby affecting the structure and properties of the particles.

The bismuth ion reduction is preferably accomplished in the presence of an inorganic hydride as a reductant, such as metal borohydride. The reduction may proceed to the formation of metal bismuth according to the following reaction:

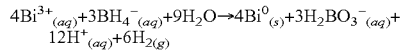

The borohydride, e.g., sodium borohydride, is introduced into the reaction vessel in a solid form and the reaction mixture is vigorously stirred. Alternatively, borohydride solution is prepared in advance and fed to the reaction mixture. In general, the amount of borohydride is adjusted to achieve $Bi^0$ doping level in the photocatalyst of not more than 7 molar %, e.g., from 0.1 to about 7 molar %, more specifically from 0.1 to 5 molar % (e.g., 0.1 to 3 molar %), relative to the total amount of the bismuth. The borohydride may be applied in a small excess over the 3:4 molar ratio required according to the chemical equation set forth above to accelerate the reduction reaction and achieve the desired doping level.

The metal reduction by means of borohydride is simple and safe. However, the reduction reaction is prone to foam formation, due to the presence of quaternary ammonium halide surfactants and sodium borohydride in an aqueous environment leading to evolution of elemental hydrogen. The addition of a small amount of a defoamer, e.g., a water miscible organic co-solvent such as ethanol concurrently with the feeding of the reductant, enables the reaction to proceed in a mild manner, with the ethanol functioning as an anti-foaming agent, allowing the homogeneous mixing of reagents. It should be noted that bismuth reduction can also be carried out using other reducing agents, such as $LiAlH_4$ (lithium aluminum hydride).

Following the addition of the reducing agent, the reduction reaction is completed within a very short period of time, e.g., not more than a few minutes. However, the reaction mixture may be kept under stirring at room temperature or slightly above room temperature for not less than 10 minutes. The solid is then separated from the liquid phase by means of conventional methods, such as filtration or decantation, washed thoroughly (e.g., with ethanol and water), and dried in air or in a vacuum oven. It is noted the process of the invention is devoid of a step of hydrothermal treatment of the reaction mixture in an autoclave.

The filtrate produced consists of a mixture of water, an organic acid (e.g., acetic acid), optionally an organic co-solvent (e.g., ethanol), quaternary ammonium cation of the formula $N^-R_1R_2R_3R_4$ as defined above and various counter ions of the reactants employed in the process. The filtrate can serve as a reaction medium for a successive production batch. The filtrate is easily regenerated; fresh amounts of those reactants which were consumed by the reaction are added to the filtrate, save for the quaternary ammonium salt surfactant whose activity as structure-directing agent can be restored in a satisfactory manner by means of an addition of a water soluble halide salt. Thus, the bismuth salt, a reducing agent and optionally an iron salt are fed to the filtrate together with water-soluble halide salt (e.g., alkali halide such as sodium chloride) and the regenerated filtrate is supplied to the next production batch for use as a reaction medium. The products which are formed in a fresh or a recycled reaction medium are equally good in respect of their photocatalytic activity. The process of the invention is hence readily applicable for large scale production either in a batch or continuous mode of operation.

Accordingly, another aspect of the invention is a process comprising combining one or more bismuth salts and at least one quaternary ammonium halide salt in the presence of a reducing agent (and optionally, if desired, $M^{p+}$ ion, e.g., trivalent metal such as ferric ion), in an acidic aqueous (or aqueous organic) reaction medium, separating a precipitate from the liquid reaction medium, collecting the liquid phase, adding water soluble halide salt to said liquid phase and recycling the same as an acidic aqueous reaction medium for bismuth oxyhalide precipitation.

Bismuth oxyhalide obtainable by the foregoing process forms another aspect of the invention. Due to the reduction of bismuth ions and the formation of elemental bismuth as a dopant, the novel compounds are identified as $Bi^{(0)}$-doped bismuth oxyhalide, which are especially selected from the group consisting of $Bi^{(0)}$doped-BiOCl, $Bi^{(0)}$doped-BiOBr and $Bi^{(0)}$doped-$BiOCl_yBr_{1-y}$ wherein y is in the range from 0.5 to 0.95, preferably from 0.6 to 0.95 (e.g., 0.7 to 0.95). Photoelectron spectroscopy can be used for the analysis of the composition of the catalyst and determination of the chemical state of bismuth present in the catalyst, e.g., on the catalyst surface. The binding energies of the Bi metal 4f band are ~157 eV and ~162 eV. For bismuth compounds, such as $Bi_2O_3$, the peaks located at ~159 eV and ~164 eV are assigned to Bi 4f 7/2 and Bi 4f 5/2, respectively. X-ray photoelectron spectrum of a sample of a compound of the invention displays peaks at binding energies of 157±1 eV and 162±1 eV, assigned to the Bi $_{(metal)}$ 4f (7/2, 5/2) photoelectrons, respectively [in addition to the peaks assigned to Bi $_{(BiOCl,\ BiOBr,\ and\ BiOCl_yBr_{1-y})}$ 4f (7/2, 5/2)]. Thus, the invention provides a compound selected from the group consisting of Bi$^{(0)}$doped-BiOCl, Bi$^{(0)}$doped-BiOBr and Bi$^{(0)}$doped-BiOCl$_y$Br$_{1-y}$ characterized in that its X-ray photoelectron emission spectrum exhibits a peak at 157±1 eV assigned to metallic bismuth. The molar concentration of the Bi$^{(0)}$ dopant in the compounds of the invention is preferably not more than 7 molar %, e.g., from 0.1 to 7.0% molar, more specifically from 0.1 to 5.0% molar, e. g., from 0.1 to 3.0 molar %, more preferably from 0.5 to 3% (for example, from 1.0 to 3.0 molar %). The molar percentage of the dopant is calculated relative to the total amounts of the trivalent and zerovalent bismuth.

The bismuth oxyhalide of the invention are crystalline, as demonstrated by their X-ray powder diffraction patterns. For example, bismuth oxychloride of the invention exhibit characteristic peaks at 12.02 2θ±0.05 and one or more peaks at 26.01, 32.25, 40.82 and 58.73 2θ (±0.05 2θ). Bismuth oxybromide of the invention exhibits characteristic peaks at 11.0 2θ±0.05 and one or more peaks at 31.78, 32.31, 39.26, 46.31, 57.23, 67.53 2θ±0.05. The mixed BiOCl$_y$Br$_{1-y}$ compounds of the invention exhibit X-ray powder diffraction pattern having a characteristic peak in the range from 11.0 to 12.2 2θ (±0.05 2θ), which peak is indicative of the Cl:Br ratio. In other words, the exact position of the indicative peak within the 11.0-12.2 2θ interval depends essentially linearly on the Cl:Br ratio, as predicted by the Vegard rule. The chemical composition of the compound belonging to the family BiOCl$_y$Br$_{1-y}$ wherein y is as defined above can be determined using EDS analysis. The composition of the BiOCl$_y$Br$_{1-y}$ compound can be also determined using XRD data and Vegard's law.

Images recorded with scanning electron microscopy indicate that the bismuth oxyhalide particles are largely spherical, in the form of microspheres exhibiting flower-like surface morphology. By the term "flower-like surface morphology" is meant that the spherical particles are characterized by the presence of individual thin sheets or plates arranged radially like petals, wherein two or more adjacent individual thin sheets are interconnected to form cells or channels which open onto the external surface of said spheres.

Particle size measured with Malvern Instruments—Mastersizer 2000 particle size analyzer shows that the average diameter of the spherical particles is from 2 to 5 microns, more specifically from 3 to 4 microns.

The preferred compounds provided by the present invention have a surface area of not less 27 m$^2$/g, more preferably not less than 30 m$^2$/g, e.g., from 30 to 35 m$^2$/g, as determined by BET (the nitrogen adsorption technique).

The compounds of the present invention can be used in the light-induced catalysis of oxidation reactions of chemical pollutants. The compounds of the invention have been found to exhibit high photocatalytic activity in decomposing organic contaminants present in water under UV-Vis and visible light irradiation. Specifically, the compounds of the invention may be used in purifying water contaminated by organic substances such as dyes and aromatic or heteroaromatic compounds which may be substituted by various chemical groups such halogen, hydroxyl, carboxylic acid, amine and keto functionalities. As illustrated in the Examples below, the compounds of the invention are useful in advancing oxidation and degradation of organic compounds including aromatic compounds such as phenol and halogen-substituted benzene, e.g., chlorobenzene, at very fast rates. The bismuth oxyhalide of the invention are capable of achieving mineralization of various organic contaminants, and even total mineralization, i.e., an essentially full oxidation of the pollutant to generate carbon dioxide.

The combination of bismuth oxyhalide of the invention and hydrogen peroxide demonstrates high efficacy in oxidizing organic pollutants. In the absence of bismuth oxyhalide, hydrogen peroxide alone does not appear to be able to advance the oxidation and decomposition of the organic contaminants. However, when hydrogen peroxide is added to a contaminated aqueous medium in which the bismuth oxyhalide is active under light irradiation, then the rate of decomposition of the organic contaminants is increased. When combined with the bismuth oxyhalide of the invention, hydrogen peroxide may be added to the aqueous system in need of purification at a concentration as low as 10 ppm. Concentration above 10 ppm are generally applied, e.g., of not less 0.01M, and specifically between 0.01 and 0.03M. As shown below, a mixture of bismuth oxyhalide and hydrogen peroxide appears to exhibit useful synergy in water decontamination.

Accordingly, in another aspect, the invention provides a method for the purification of water, comprising adding the photocatalyst of the invention as identified above to water contaminated with organic compound(s) and light irradiating the photocatalyst (e.g., with UV-Vis light or visible light), optionally in the presence of hydrogen peroxide. Preferably, the organic pollutants undergo mineralization and more preferably total mineralization.

For example, the purification method of the present invention may be conducted by feeding the contaminated water to be treated into a suitable reactor, e.g., a plug flow reactor loaded with the catalyst (e.g., in a granular form), and irradiating said reactor, preferably at room temperature. Contaminated water is circulated through the irradiated packed reactor at a selected flow rate to secure a desired level of purification. Catalytically effective concentration of the bismuth oxyhalide may vary from 100 ppm to 1000 ppm, e.g., an amount of 250 to 700 ppm of the catalyst is added to an aqueous system which may typically contain contaminants at a concentration of up to 1000 ppm.

Useful UV-Vis and visible light sources include xenon arc lamps, halogen lamps or lasers. Solar irradiation is also effective. In general, the irradiation period depends on the identity of the organic contaminant to be destroyed, its concentration in the aqueous medium, the catalyst employed and the loading of the catalyst in the reactor. The irradiation period is not less than 3-5 minutes, e.g., between about 10 minutes and several hours, and the progress of the decomposition of the targeted contaminants can be monitored using conventional techniques, such as spectroscopic methods in order to determine that a characteristic absorption peak has reduced in intensity or completely vanished, or by measuring Chemical Oxygen Demand (COD) or Total Organic Carbon (TOC) of the water under treatment.

Bismuth oxyhalide can also be applied in the form of a thin film onto the surface of a suitable substrate, e.g., made of glass or aluminum. Co-assigned WO 2012/066545 discloses that bismuth oxyhalide compounds can be embedded in an adhesive matrix (e.g., siloxane-based matrix) which can be affixed to a surface of a substrate in the form of a thin film demonstrating photocatalytic activity in response to sun light irradiation. WO 2012/066545 specifically exemplifies the coating of a glass substrate with a dispersion of the photocatalyst in siloxane-based system.

We have now found a versatile method for creating bismuth oxychloride-containing thin films onto the surface of a substrate, including a surface which exhibits slight roughness. The method consists of preparing two separate solutions: a first solution which contains the coating-forming materials and either bismuth or halide source (the "coating solution"), and a second solution which contains the counter ion (either halide or $Bi^{3+}$, respectively). The coating solution is applied onto the surface of the substrate, for example by a dip coating technique whereby the substrate is immersed in the coating solution and pulled up to deposit the coating layer, followed by spraying the second solution onto the coating layer, to allow the instantaneous precipitation of the bismuth oxyhalide, thereby creating bismuth oxychloride-containing thin film.

The coating solution is preferably prepared by first dissolving the film-forming material (e.g., a siloxane precursor such as tetraethyl orthosilicate) in an acidic aqueous solution, in which a water-miscible organic co-solvent is also present (e.g., ethanol). For this purpose, a mineral acid such as nitric acid can be used. Then, one or more auxiliary organic compounds which are decomposable under calcination conditions are added to the siloxane solution, to improve the properties of the film to be produced. For example, in order to assure that the catalyst particles are uniformly dispersed in the film, long chain polymers, e.g., poloxamer triblock copolymers (such as Pluronic P123) are added to the coating solution. Pore forming agents such as polyvinyl alcohol (PVA) may be added to the coating solution, such that upon removal during the final calcination step, pores are formed in the siloxane matrix. Finally, a solution of a bismuth salt is added to the mixture, which is vigorously stirred until a uniform coating solution is obtained.

The second solution is readily prepared by dissolving the halide source, e.g., the quaternary ammonium halide, in water-alcohol solution and adding the solution to a spraying device.

Finally, a thoroughly cleaned surface of a suitable substrate (e.g., a transparent glass) is dip coated with the coating solution and the halide-containing solution is gently sprayed onto the coating. Following calcination (up to 400° C. under slow heating rate), a thin film (with a thickness varying from 1 to 100 μm) is formed, affixed to the surface of the substrate.

EXAMPLES

Methods

Figure 1:
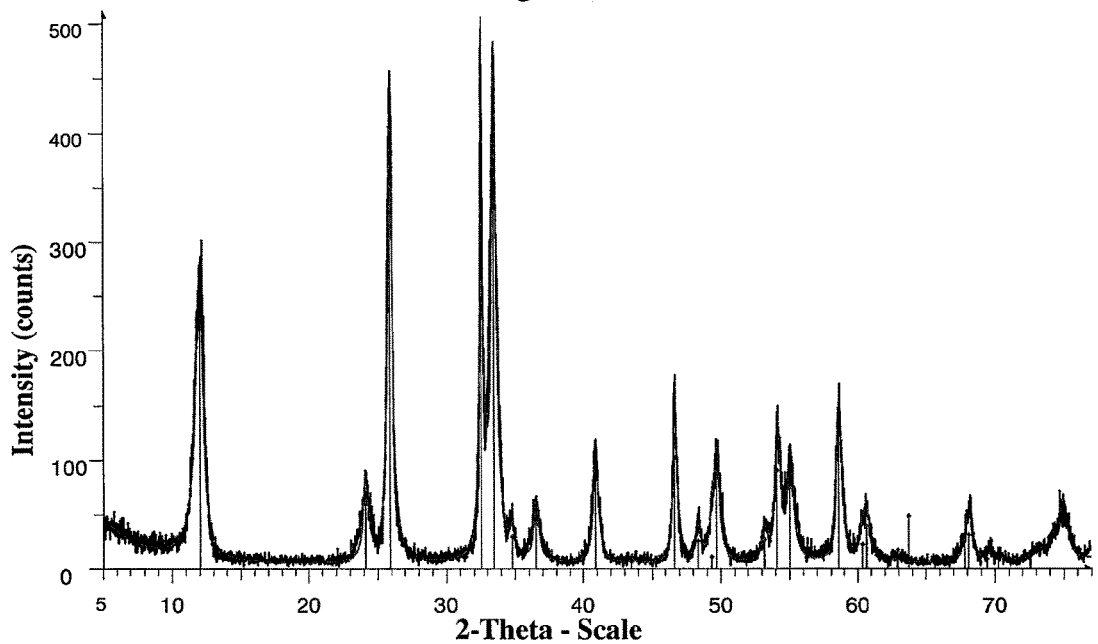
FIG. 1 is a characteristic X-ray powder diffraction pattern of the BiOCl compound of the invention.

XRD measurements were performed on D8 Advance diffractometer (Bruker AXS, Karlsruhe, Germany) with a goniometer radius 217.5 mm, Gabel Mirror parallel-beam optics, 2° Sollers slits and 0.2 mm receiving slit. Low background quartz sample holder was carefully filled with the powder samples. XRD patterns from 5° to 85° 2θ were recorded at room temperature using CuKα radiation ($\lambda$=0.15418 nm) with the following measurement conditions: tube voltage of 40 kV, tube current of 40 mA, step scan mode with a step size 0.02° 2θ and counting time of is per step for preliminary study and 12 s per step for structural refinement. The instrumental broadening was determined using $LaB_6$ powder (NIST-660a).

Morphological observations and identification of chemical composition were performed with the HRSEM-High Resolution Scanning Electron Microscope-Sirion (equipped with EDS LN2 detector, Oxford instruments, UK).

XPS analysis was conducted using XPS Kratos AXIs Ultra (Kratos Analytical Ltd., UK) high resolution photoelectron spectroscopy instrument.

UV spectroscopy analysis was carried out by means of UV-vis spectrophotometer (Varian EL-03097225).

Chemical Oxygen Demand (COD) was measured using COD meter-DIN38404-C3 standard.

Total organic carbon (TOC) was measured using PF-11 photometer.

Example 1

Preparation of Bismuth Oxychloride in the Presence of a Reducing Agent and Ferric Ions Deionized water (40 ml), glacial acetic acid (40 ml) and bismuth nitrate pentahydrate $Bi(NO_3)_3 \cdot 5H_2O$ (9.7 g) are placed in 250 ml flask and stirred at room temperature for fifteen minutes until a clear solution is formed. The solution is added to a second flask which was previously charged with CTAC (25.6 g of 25 wt % CTAC aqueous solution) and ammonium iron(III) sulfate $NH_4Fe(SO_4)_2$ (0.096 g). Sodium borohydride (0.01 g) and ethanol (10 ml) are also added to the reaction mixture, which is stirred for additional 60 minutes at about 30° C.

The precipitate thus formed is separated from the liquid phase by filtration, washed five times with ethanol (5×50 ml) and then five times with water (5×200 ml). The off-white solid product is then dried (3 hours in air). The weight of the dried solid collected is ~7 g.

Figure 2:
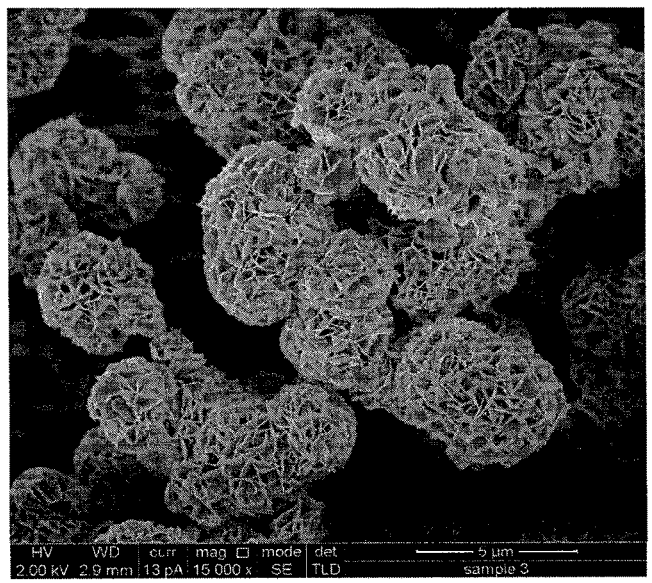
FIG. 2 is an image recorded with a scanning electron microscope showing BiOCl particles with flower-like morphology.

The X-ray powder diffraction pattern of the resultant bismuth oxychloride is presented in FIG. 1. The product exhibits X-ray powder diffraction pattern having characteristic peaks at 12.02, 26.01, 32.25, 40.82, 58.73 2θ (±0.05 2θ). The product is characterized by average particle size of 3 μm and surface area of 31 m²/g. FIG. 2 presents SEM image of the particles showing their flower-like morphology. The particles are relatively uniform in size, e.g., a representative single particle size is about 3 μm.

Figure 3:
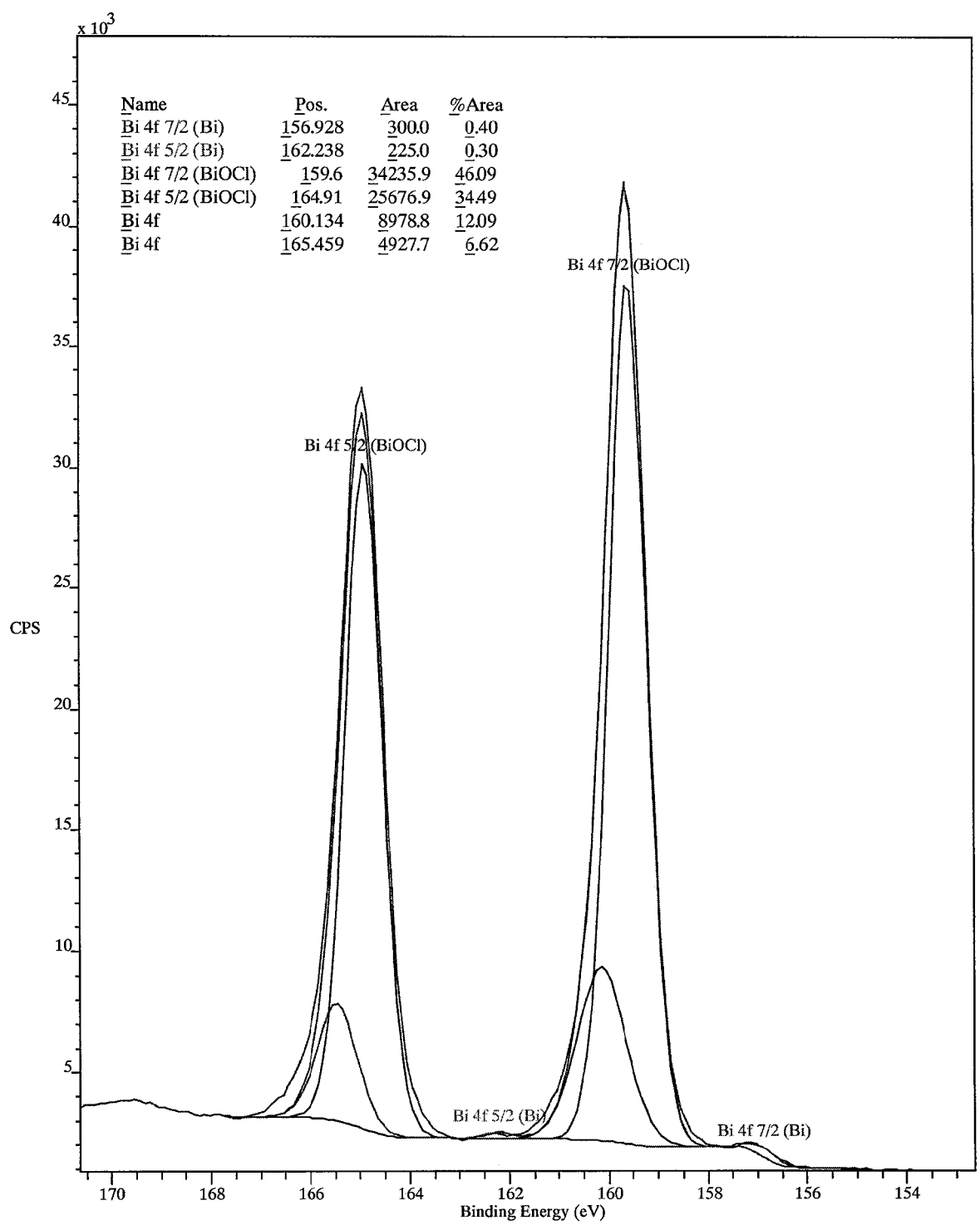
FIG. 3 shows the X-ray photoelectron emission spectrum of the $Bi^{(0)}$doped-BiOCl of the invention.

XPS was used for the analysis of the composition of the solid. FIG. 3 shows the X-ray photoelectron emission spectrum of the sample. The peaks at binding energies of ~156.9 eV and 162.2 eV are assigned to the $Bi_{(metal)}$ 4f (7/2, 5/2) photoelectrons, respectively. The compound is identified as $Bi^{(0)}$doped-BiOCl.

Example 2

Precipitation of Bismuth Oxychloride from a Recycled Filtrate in the Presence a Reducing Agent and Ferric Ions The filtrate obtained following the separation of the solid product in Example 1 was reused as a reaction medium in this Example. The filtrate contains acetic acid, ethanol, water and the cationic part of the surfactant. To this filtrate were added $Bi(NO_3)_3 \cdot 5H_2O$ (9.7 g), ammonium iron sulphate (0.096 g dissolved in 5 ml water), sodium borohydride (0.01 g), sodium chloride (1.17 g) and ethanol (10 ml). The reaction mixture was allowed to stand for 60 minutes under mixing at 30° C.

The precipitate thus formed is separated from the liquid phase by filtration, washed five times with ethanol (5×50 ml) and then five times with water (5×200 ml). The off-white solid product is then dried (3 hours in air). The weight of the dried solid collected is ~7 g.

Figure 4:
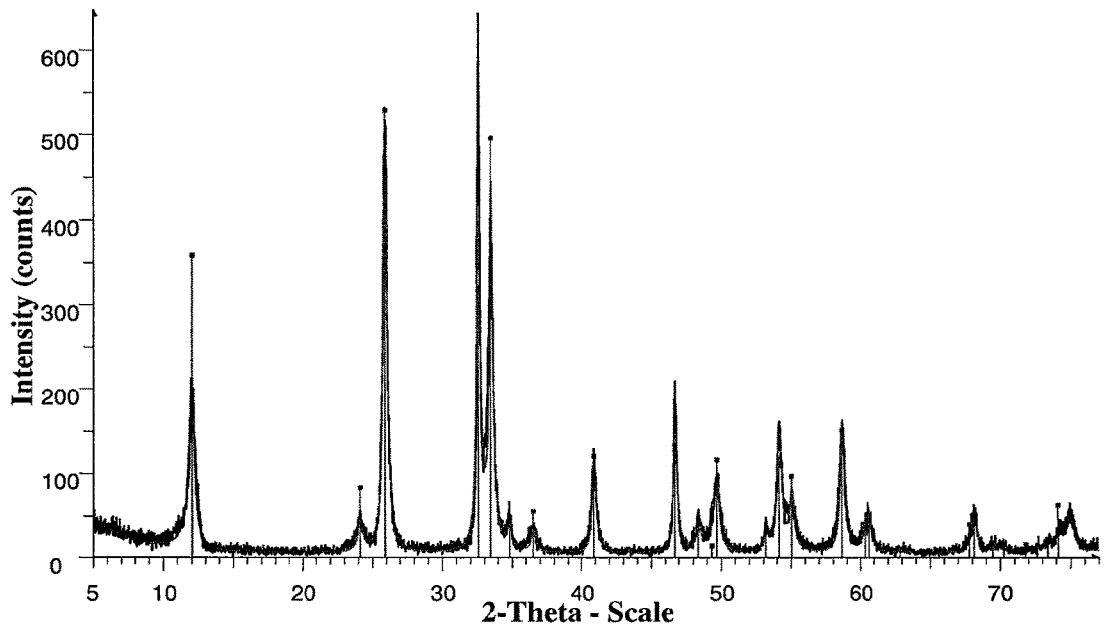
FIG. 4 is a characteristic X-ray powder diffraction pattern of the BiOCl compound obtained by a process of the invention involving a filtrate recycling.
Figure 5:
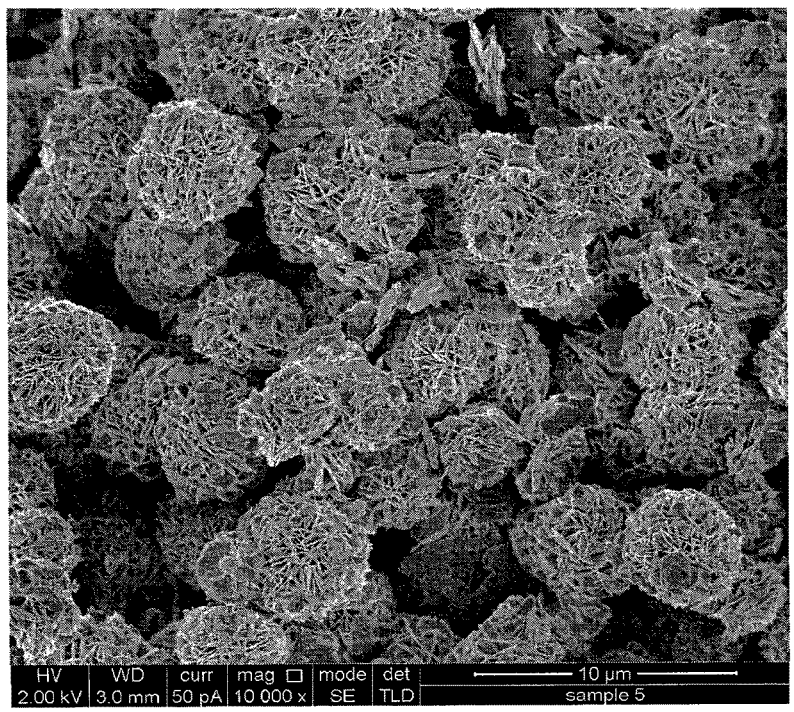
FIG. 5 is an image recorded with a scanning electron microscope showing BiOCl particles with flower-like morphology obtained by a process of the invention involving a filtrate recycling.

The X-ray powder diffraction pattern shown in FIG. 4 and the SEM image of FIG. 5 are comparable to the XRPD and SEM image of FIGS. 1 and 2, respectively, demonstrating that the crystallinity and particle morphology of bismuth oxyhalide which precipitates from a recycled filtrate and from a fresh reaction medium (Example 1) are essentially the same.

Example 3

Preparation of Bismuth Oxybromide in the Presence of a Reducing Agent and Ferric Ions Deionized water (40 ml), glacial acetic acid (40 ml) and bismuth nitrate pentahydrate $Bi(NO_3)_3 \cdot 5H_2O$ (9.7 g) are placed in 250 ml flask and stirred at room temperature for fifteen minutes until a clear solution is formed. The solution is added to a second flask which was previously charged with CTAB solution (7.28 g dissolved in 20 ml of water) and ammonium iron(III) sulfate $NH_4Fe(SO_4)_2$ (0.48 g). Sodium borohydride (0.04 g) and ethanol (10 ml) are added to the reaction mixture which is stirred for additional 60 minutes at about 30° C.

The precipitate thus formed is separated from the liquid phase by filtration, washed five times with ethanol (5×50 ml) and then five times with water (5×200 ml). The off-white solid product is then dried (3 hours in air). About 7 g of a slightly hygroscopic product were collected, containing ~5-10% water.

Figure 6:
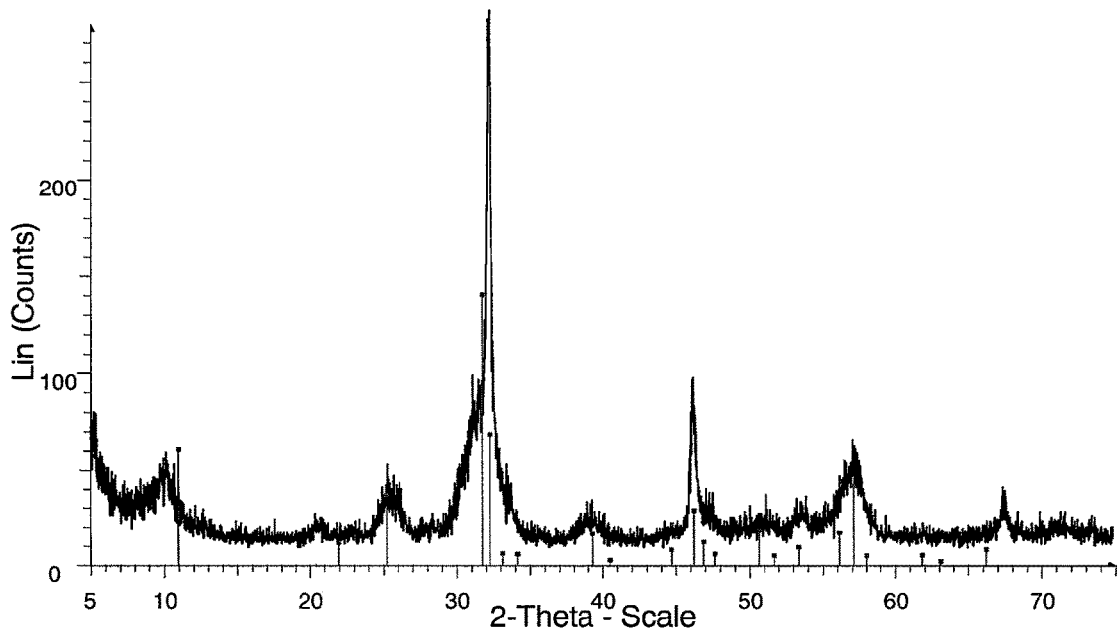
FIG. 6 is a characteristic X-ray powder diffraction pattern of the BiOBr compound of the invention.
Figure 7:
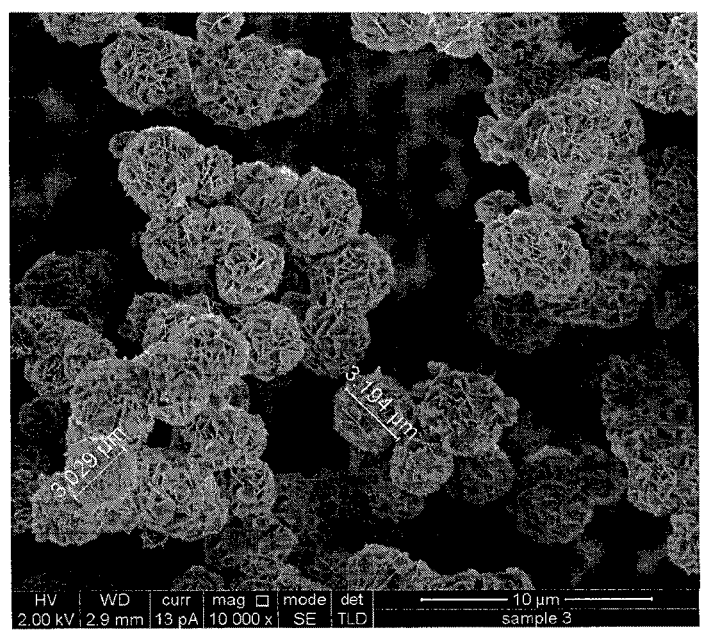
FIG. 7 is an image recorded with a scanning electron microscope showing BiOBr particles with flower-like morphology.

The X-ray powder diffraction pattern of the resultant bismuth oxybromide is presented in FIG. 6. The product exhibits X-ray powder diffraction pattern having characteristic peaks at 11.00, 31.78, 32.31, 39.26, 46.31, 57.23, 67.53 (±0.05 2θ). The product is characterized by average particle size of 3 μm and surface area of 30 m²/g. FIG. 7 presents SEM image of the particles showing their flower-like morphology. The particles are relatively uniform in size; a representative single particle size is 3 μm.

Example 4

Preparation of Mixed Halide $BiOCl_{0.875}Br_{0.125}$ in the Presence of a Reducing Agent and Ferric Ions Deionized water (45 ml), glacial acetic acid (50 ml) and bismuth nitrate (14.69 g) are added to a flask and are mixed at room temperature for fifteen minutes until a clear, transparent solution is formed. CTAB (1.378 g dissolved in 10 ml of water), CTAC (8.48 g in the form of 25 wt % aqueous solution) and ammonium iron (III) sulfate (146 mg dissolved in 10 ml water) are added to the bismuth solution. Finally, sodium borohydride (0.015 g) and ethanol (10 ml) are added to the reaction mixture, which is then stirred for additional 60 minutes at about 30° C.

The precipitate thus formed is separated from the liquid phase by filtration, washed five with ethanol (5×50 ml) and then five times with water (5×200 ml). The solid is then dried in air. The weight of the solid collected is ~10.5 grams.

Figure 8:
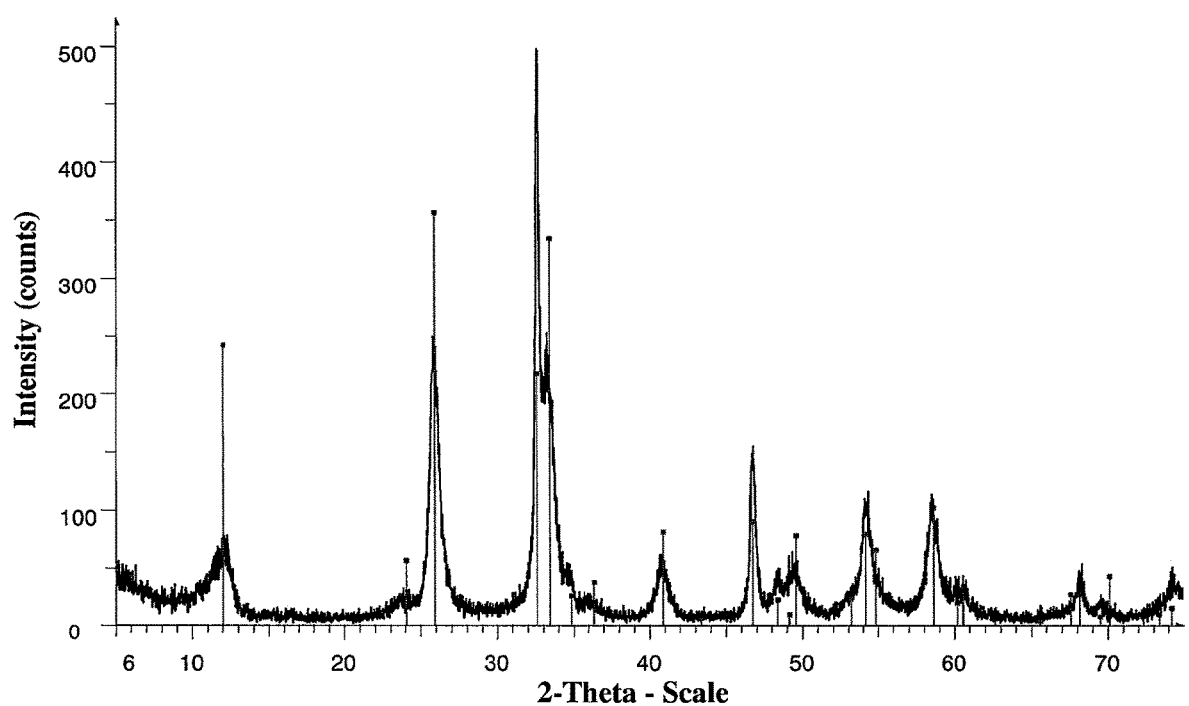
FIG. 8 is a characteristic X-ray powder diffraction pattern of a mixed bismuth oxyhalide $BiOCl_{0.875}Br_{0.125}$ compound of the invention.

The X-ray powder diffraction pattern of the resultant mixed bismuth oxyhalide is presented in FIG. 8. The product exhibits X-ray powder diffraction pattern having a characteristic peak at 11.74 2θ (±0.05 2θ) and additional peaks at 32.56, 36.06, 46.70 and 49.41 2θ (±0.05 2θ). The product is characterized by average particle size of 1 μm and surface area of 34 m²/g.

Figure 9:
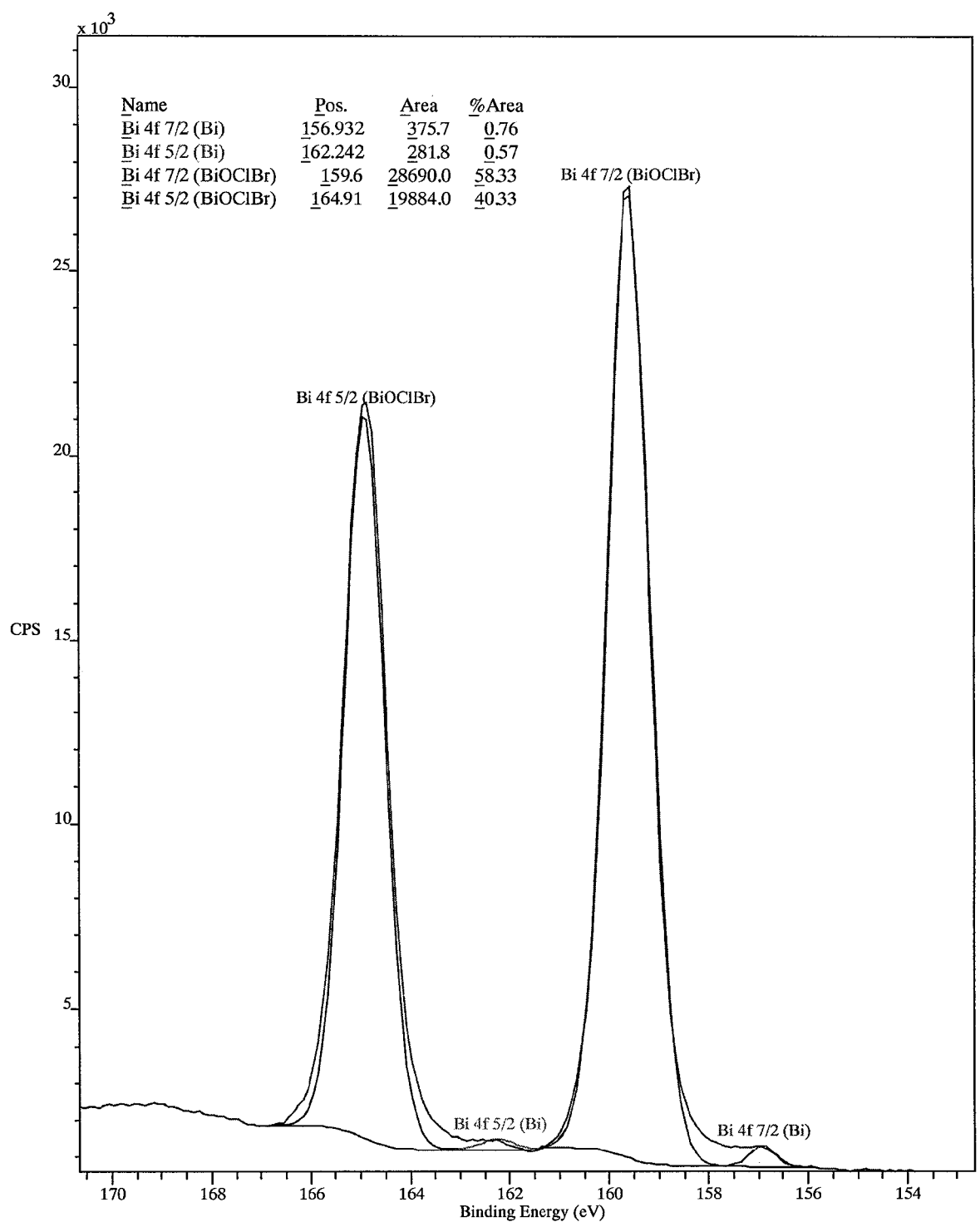
FIG. 9 shows the X-ray photoelectron emission spectrum of the $Bi^{(0)}$doped-$BiOCl_{0.875}Br_{0.125}$ of the invention.

XPS was used for the analysis of the composition of the solid. FIG. 9 shows the X-ray photoelectron emission spectrum of the sample. The peaks at binding energies of ~156.9 eV and 162.2 eV are assigned to the $Bi_{(metal)}$ 4f (7/2, 5/2) photoelectrons, respectively. The product is identified as $Bi^{(0)}$doped-$BiOCl_{0.875}Br_{0.125}$.

Example 5

Preparation of $Bi^{(0)}$ Doped-Mixed Halide $BiOCl_{0.875}Br_{0.125}$

Deionized water (50 ml), glacial acetic acid (40 ml) and bismuth nitrate (14.69 g) are added to a flask and are mixed at room temperature for fifteen minutes until a clear, transparent solution is formed. The so-formed solution is added to a previously prepared solution consisting of CTAC (33.92 g of 25 wt % aqueous solution) and CTAB (1.38 g). Finally, sodium borohydride (11.456 mg) and ethanol (20 ml) are added to the reaction mixture, which is then stirred for additional 60 minutes at about 25-30° C.

The precipitate thus formed is separated from the liquid phase by filtration, washed five with ethanol (5×50 ml) and then five times with water (5×200 ml). The off-white solid is then dried (3 hours in air). The weight of the solid collected is ~9 grams.

Example 6

Preparation of $Bi^{(0)}$ Doped-Mixed Halide $BiOCl_{0.875}Br_{0.125}$

The procedure of Example 5 was repeated, with a twofold increase of the amount of the reducing agent (22.913 mg of sodium borohydride is added to the reaction mixture).

The precipitate thus formed is separated from the liquid phase by filtration, washed five with ethanol (5×50 ml) and then five times with water (5×200 ml). The off-white solid is then dried (3 hours in air). The weight of the solid collected is ~9 grams.

Figure 10:
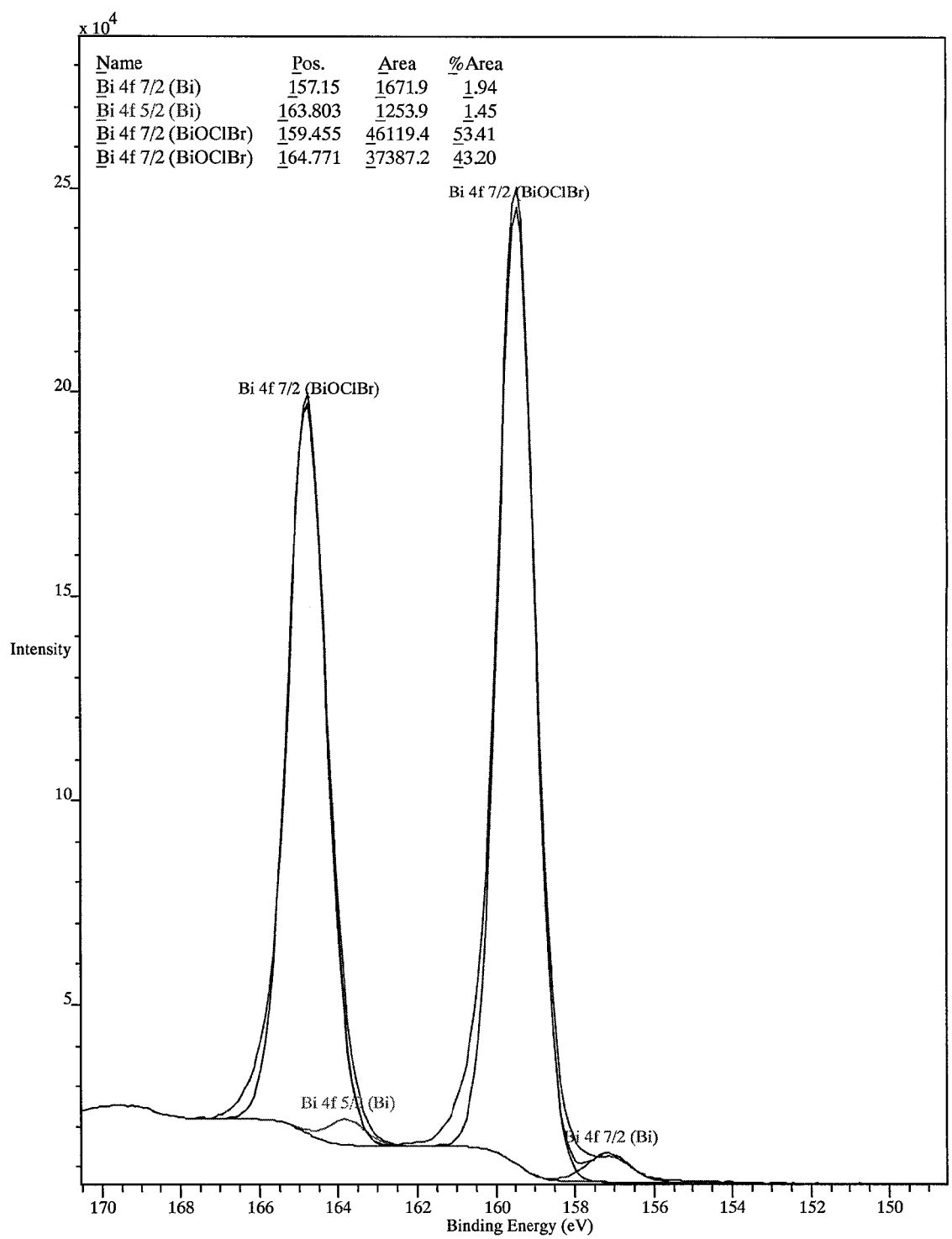
FIG. 10 shows the X-ray photoelectron emission spectrum of the $Bi^{(0)}$doped-$BiOCl_{0.875}Br_{0.125}$ of the invention.

XPS was used for the analysis of the composition of the solid. FIG. 10 shows the X-ray photoelectron emission spectrum of the sample. The peaks at binding energies of ~157.15 eV and 163.8 eV are assigned to the $Bi_{(metal)}$ 4f (7/2, 5/2) photoelectrons, respectively. The product is identified $Bi^{(0)}$doped-$BiOCl_{0.875}Br_{0.125}$.

Example 7

Preparation of $Bi^{(0)}$ Doped-BiOBr

Deionized water (50 ml), glacial acetic acid (40 ml) and bismuth nitrate (9.7 g) are added to a flask and are mixed at room temperature for fifteen minutes until a clear, transparent solution is formed. The so-formed solution is added to a previously prepared aqueous ethanolic solution of CTAB (1.38 g CTAB dissolved in a mixture consisting of 30 ml ethanol and 10 ml deionised water). Finally, sodium borohydride (7.56 mg) is added to the reaction mixture, which is then stirred for additional 60 minutes at about 25-30° C.

The precipitate thus formed is separated from the liquid phase by filtration, washed five with ethanol (5×50 ml) and then five times with water (5×200 ml). The off-white solid is then dried (3 hours in air). The weight of the solid collected is ~7 grams.

Figure 11:
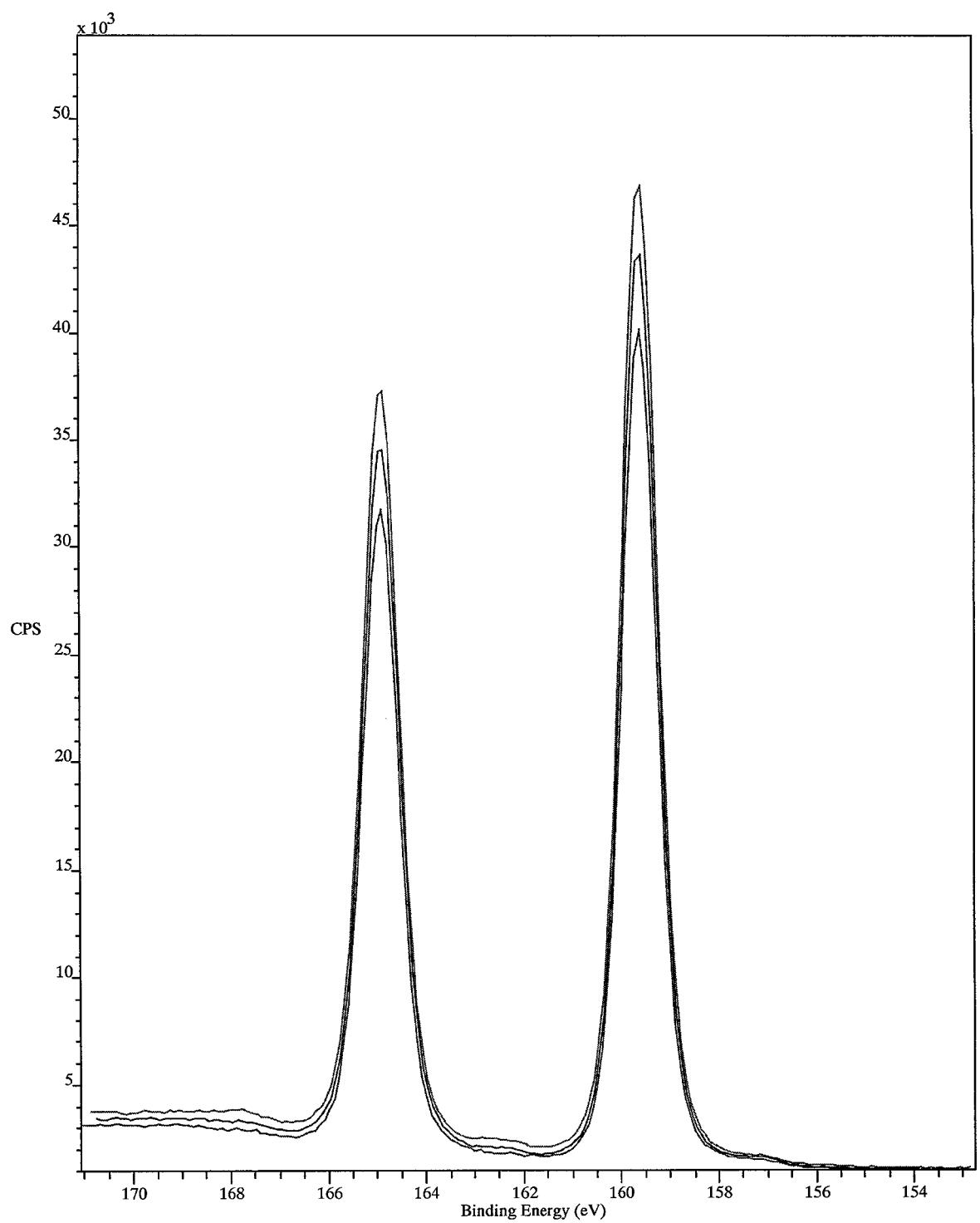
FIG. 11 shows the X-ray photoelectron emission spectrum of the $Bi^{(0)}$doped-BiOBr of the invention.

XPS was used for the analysis of the composition of the solid. FIG. 11 shows the X-ray photoelectron emission spectrum of the sample. The peaks at binding energies of ~156.8 eV and 164.9 eV are assigned to the $Bi_{(metal)}$ 4f (7/2, 5/2) photoelectrons, respectively. The product is identified as $Bi^{(0)}$doped-BiOBr.

Example 8

Preparation of $Bi^{(0)}$ Doped-Mixed Halide $BiOCl_{0.67}Br_{0.33}$

Deionized water (50 ml), glacial acetic acid (40 ml) and bismuth nitrate (3.27 g) are added to a flask and are mixed at room temperature for fifteen minutes until a clear, transparent solution is formed. The so-formed solution is added to a previously prepared solution consisting of CTAC (3.2 g in 25 wt % aqueous solution) and CTAB (1.82 g). Finally, sodium borohydride (5.70 mg) and ethanol (20 ml) are added to the reaction mixture, which is then stirred for additional 60 minutes at about 25-30° C.

The precipitate thus formed is separated from the liquid phase by filtration, washed five with ethanol (5×50 ml) and then five times with water (5×200 ml). The off-white solid is then dried (3 hours in air). The weight of the solid collected is ~5 grams.

Figure 12:
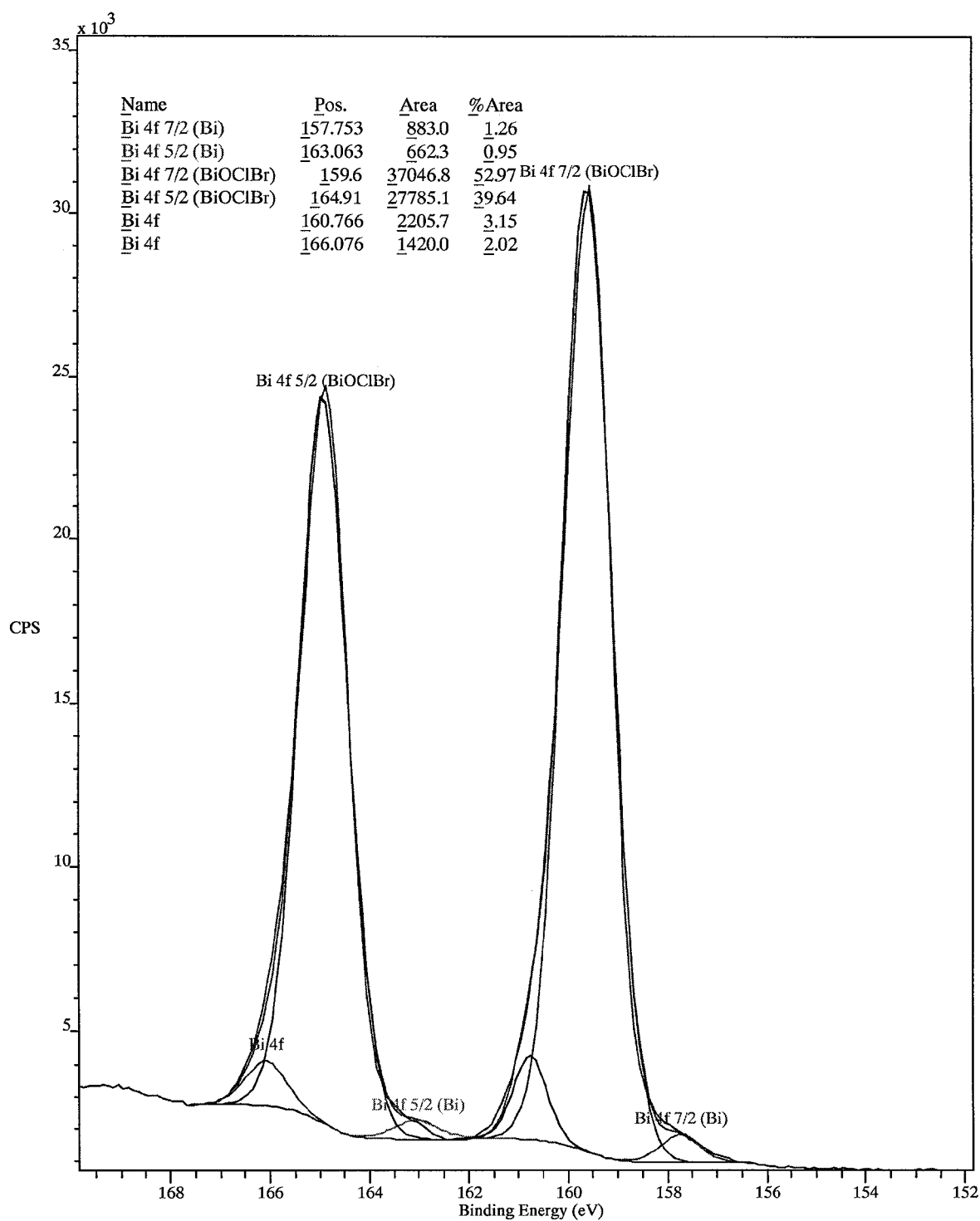
FIG. 12 shows the X-ray photoelectron emission spectrum of the $Bi^{(0)}$doped-$BiOCl_{0.67}Br_{0.33}$ of the invention.
Figure 13:
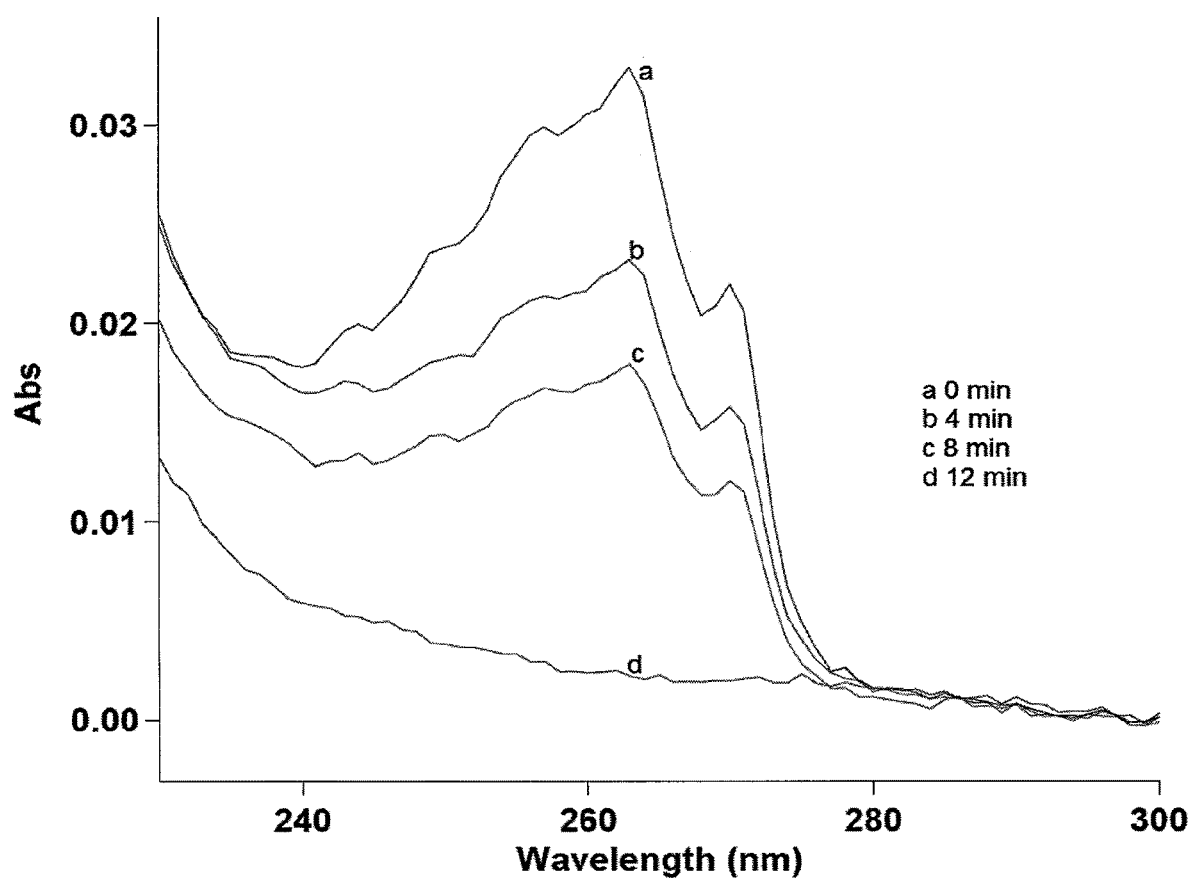
FIG. 13 presents UV spectra demonstrating the progress of chlorobenzene degradation in an aqueous solution in the presence of the compound of the invention activated with light irradiation.
Figure 14:
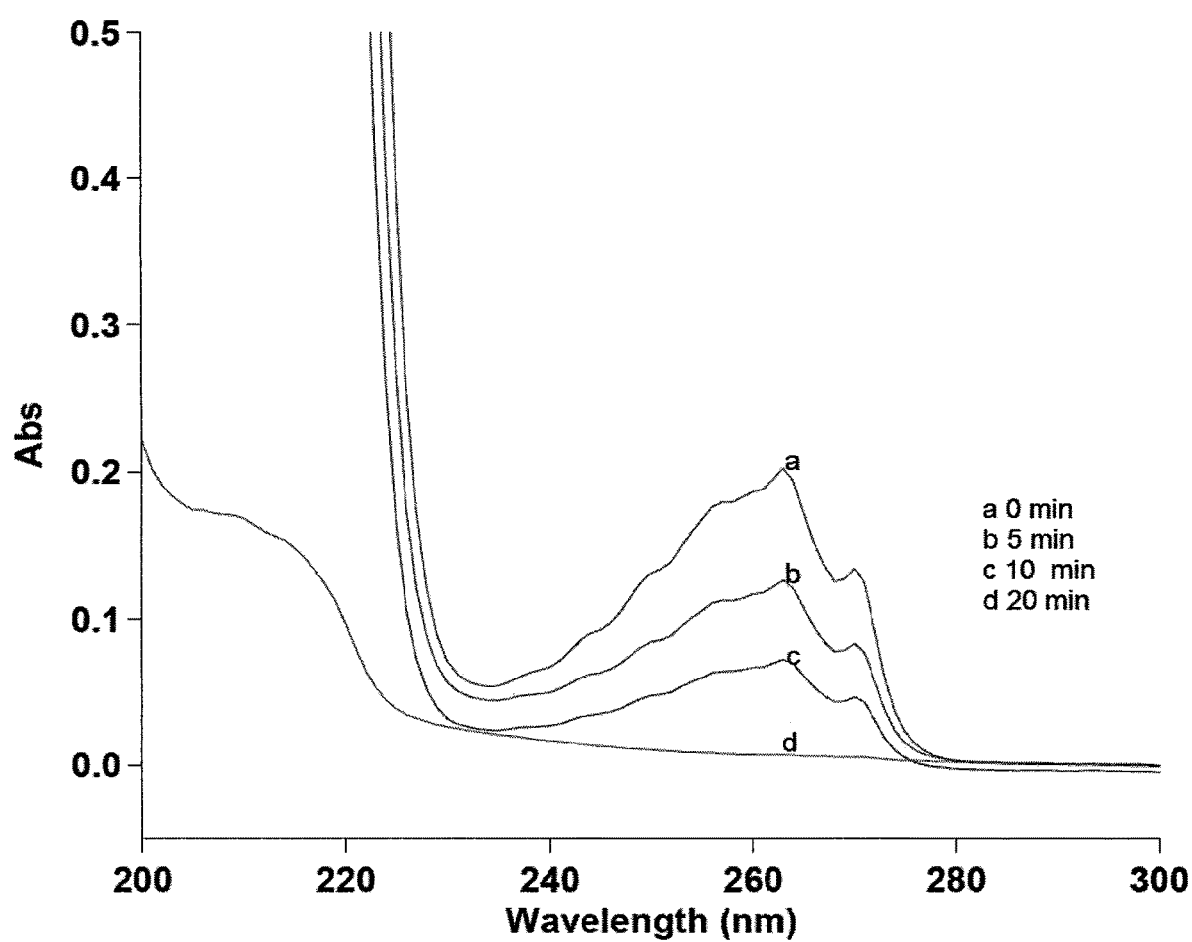
FIG. 14 presents UV spectra demonstrating the progress of chlorobenzene degradation in aqueous solution in the presence of the compound of the invention activated with light irradiation.
Figure 15:
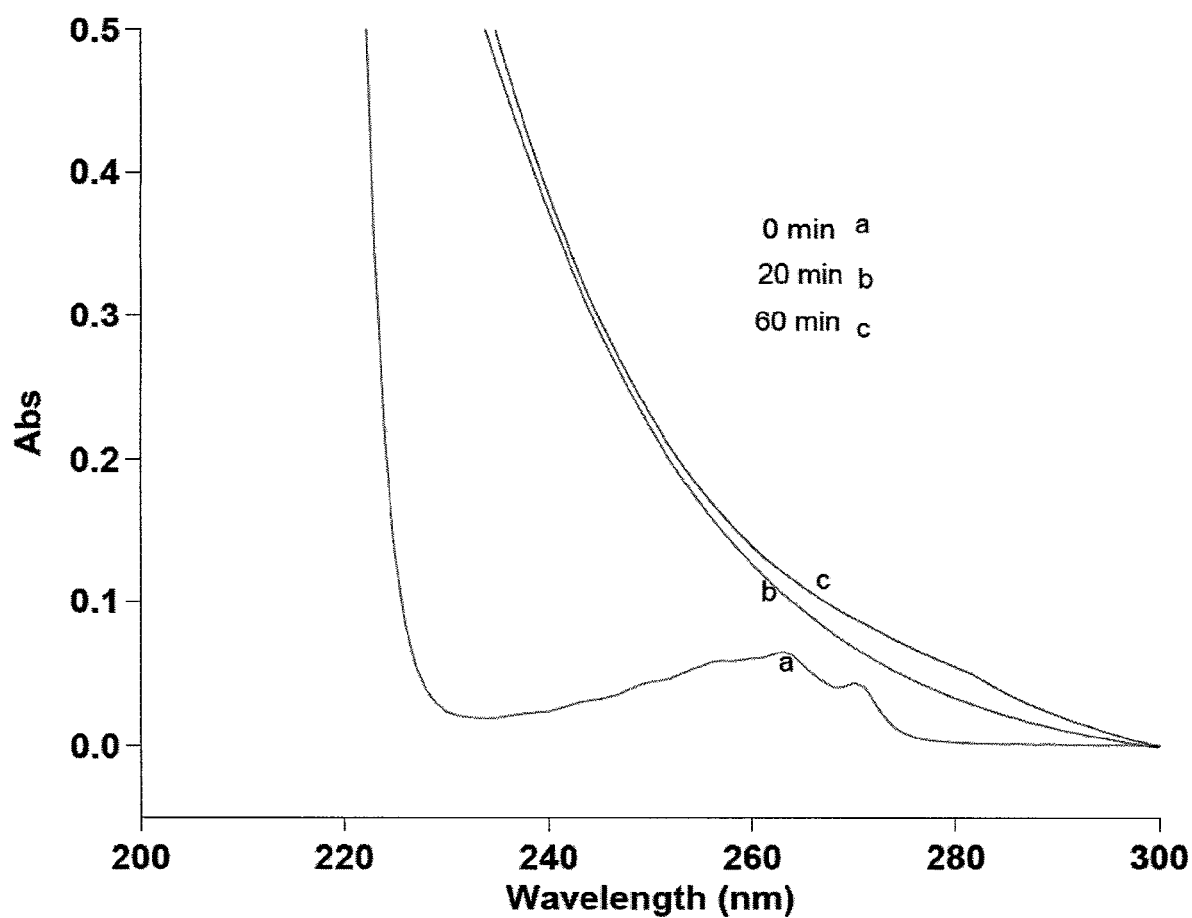
FIG. 15 presents UV spectra of chlorobenzene in aqueous solution in the presence of hydrogen peroxide.
Figure 16:
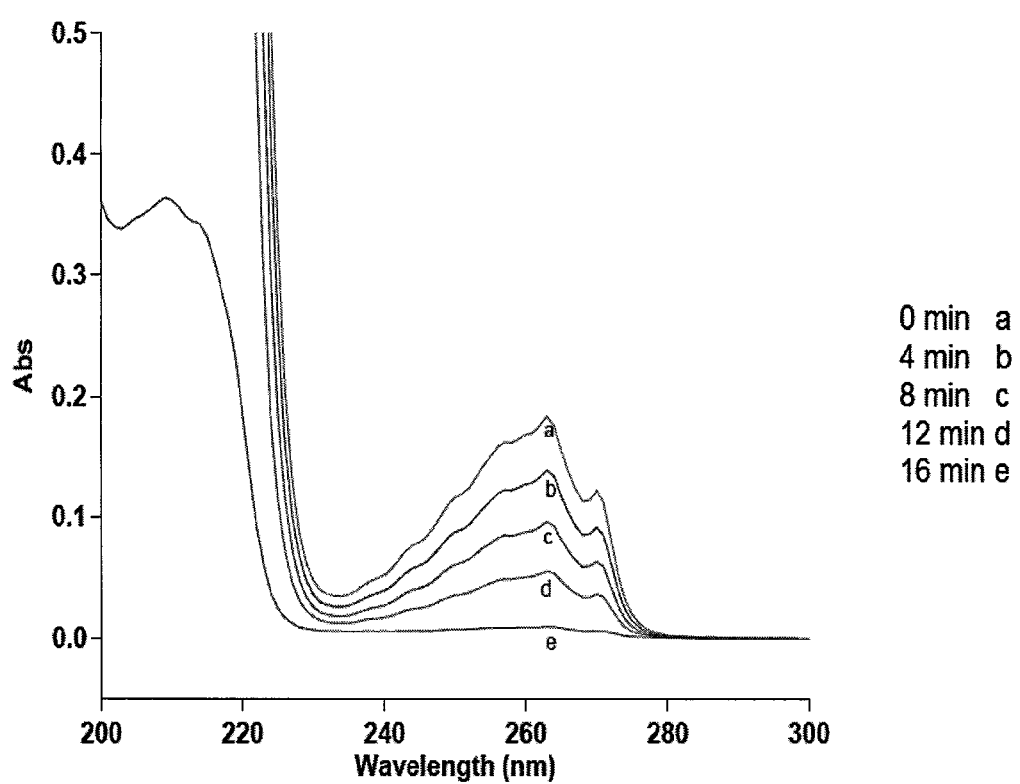
FIG. 16 presents UV spectra demonstrating the progress of chlorobenzene degradation in aqueous solution in the presence of both the compound of the invention activated with light irradiation and hydrogen peroxide.
Figure 17:
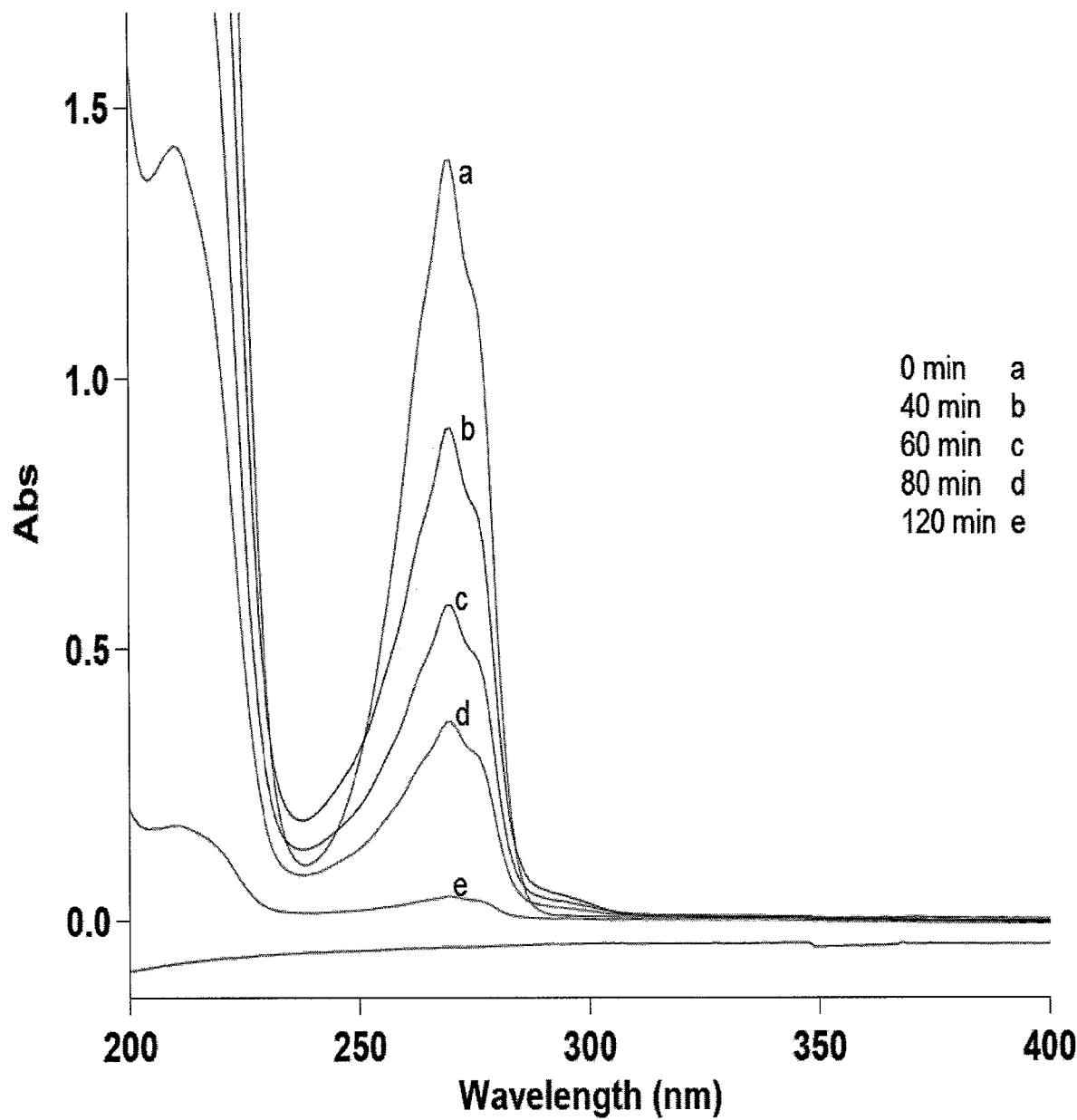
FIG. 17 presents UV spectra demonstrating the progress of phenol degradation in aqueous solution in the presence of the compound of the invention activated with light irradiation.
Figure 18:
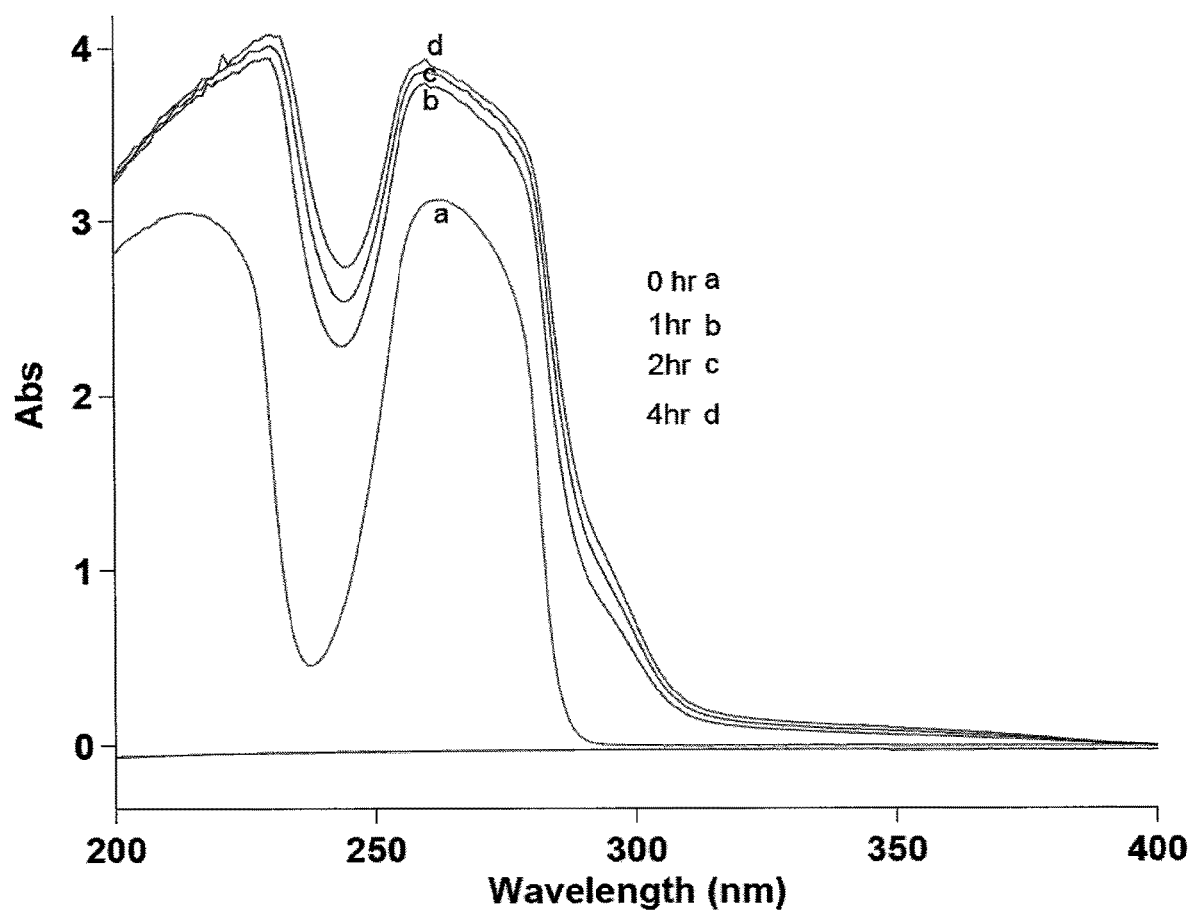
FIG. 18 presents UV spectra of phenol in aqueous solution in the presence of hydrogen peroxide.
Figure 19:
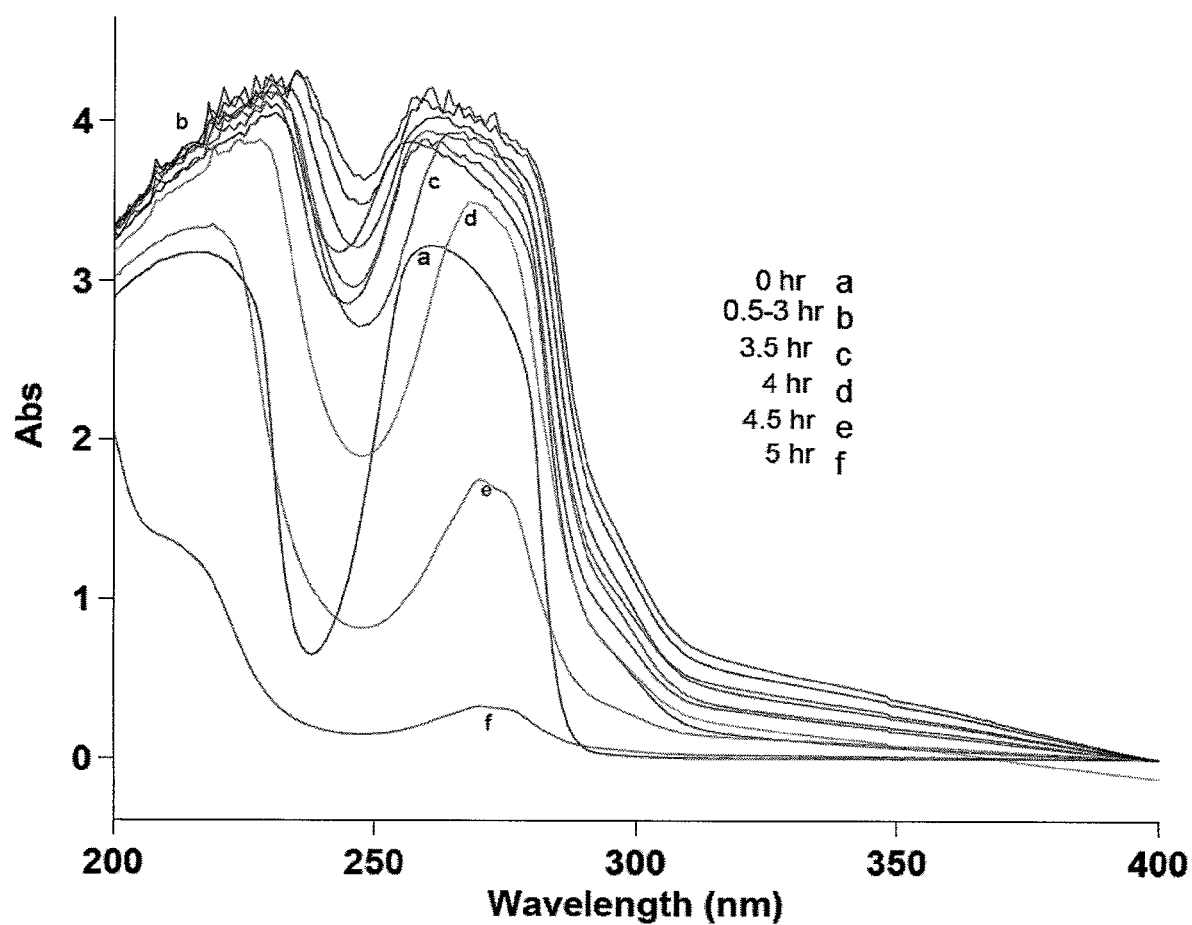
FIG. 19 presents UV spectra demonstrating the progress of phenol degradation in water in the presence of the compound of the invention under light irradiation and hydrogen peroxide.
Figure 20:
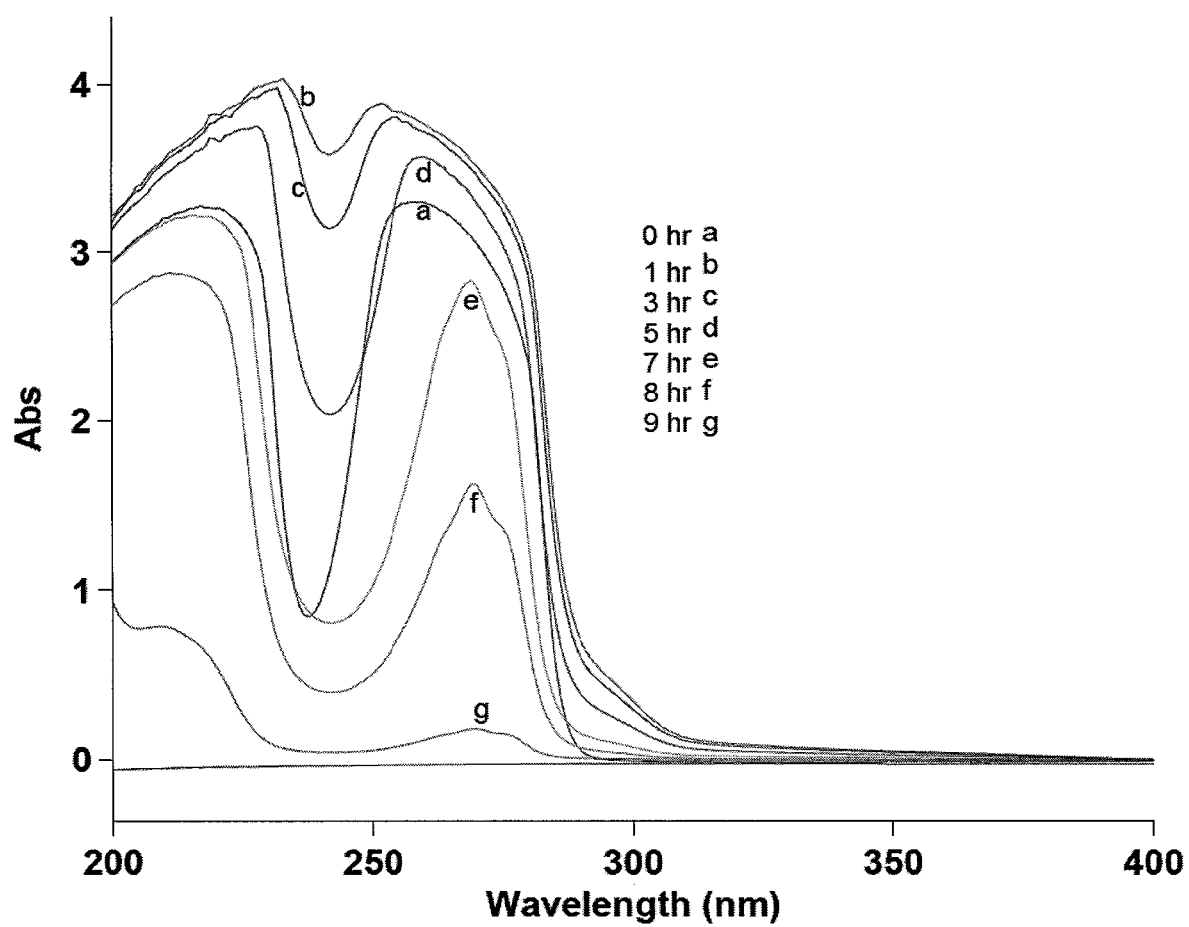
FIG. 20 presents UV spectra demonstrating the progress of phenol degradation in water in the presence of both the compound of the invention activated with light irradiation and hydrogen peroxide.

XPS was used for the analysis of the composition of the solid. FIG. 12 shows the X-ray photoelectron emission spectrum of the sample. The peaks at binding energies of ~157.75 eV and 163.06 eV are assigned to the $Bi_{(metal)}$ 4f (7/2, 5/2) photoelectrons, respectively. The product is identified as $Bi^{(0)}$doped-$BiOCl_{0.67}Br_{0.33}$.

Some of the photocatalysts prepared in the foregoing examples are tabulated in Table A.

TABLE A

| Example | Compound | $Bi^{(0)}$ 4f 7/2 XPS peak | Dopant level |
|---|---|---|---|
| 1 | $Bi^{(0)}$ doped-BiOCl | 156.9 eV (FIG. 3) | ~1 mole % |
| 4, 5 | $Bi^{(0)}$doped-$BiOCl_{0.875}Br_{0.125}$ | 156.9 eV (FIG. 9) | ~1 mole % |
| 6 | $Bi^{(0)}$doped-$BiOCl_{0.875}Br_{0.125}$ | 157.1 eV (FIG. 10) | ~2 mole % |
| 7 | $Bi^{(0)}$ doped-BiOBr | 156.8 eV (FIG. 11) | ~1.5 mole % |
| 8 | $Bi^{(0)}$doped-$BiOCl_{0.670}Br_{0.330}$ | 157.7 eV (FIG. 12) | ~3 mole % |

Examples 9-16

Water Decontamination: Decomposition of Organic Contaminants in Aqueous Medium in the Presence of the Compound of the Invention Under Light Irradiation Samples were prepared by adding an organic compound (either chlorobenzene or phenol) to 200 ml of water. The compound of Example 1 was added in varying amounts to the samples and was tested for its photocatalytic activity on destruction of the organic compound under irradiation with Xenon lamp (300 W) located at a distance of 10 cm from the sample, at wavelength 250-740 nm. The compound of Example 1 was used either alone or in combination with hydrogen peroxide (30% aqueous $H_2O_2$ solution). Table 1 below shows the concentration of the organic contaminant in the sample, the amount of the compound of Example 1 present in the sample and the volume of 30% hydrogen peroxide solution added to the sample. For the purpose of comparison, the oxidation activity of hydrogen peroxide alone was also evaluated, i.e., in the absence of the compound of the invention.

The decomposition of the organic compound under the conditions set forth above was determined by periodically analyzing the tested sample by means of UV spectroscopy. The spectra obtained for each experiment are presented in FIGS. 13-20, which correspond to Examples 9 to 16, respectively. The spectra show that in the presence of the photocatalyst of the invention, the intensity of the characteristic UV absorbance peak assigned to the organic contaminant (for chlorobenzene ~262 nm, phenol ~270 nm) decreases gradually with the passage of time, until the peak finally vanishes, indicating full oxidation of the organic compound to carbon dioxide.

TABLE 1

| Example | Organic Contaminant (concentration) | BiOCl of Example 1 (mg) | Hydrogen Peroxide (ml) | Observations |
|---|---|---|---|---|
| 9 | Chlorobenzene (200 ppm) | 100 | 0 | Full decomposition of the contaminant after 12 minutes (FIG. 13) |
| 10 | Chlorobenzene (400 ppm) | 200 | 0 | Full decomposition of the contaminant after 20 minutes (FIG. 14) |
| 11 comparative | Chlorobenzene (200 ppm) | 0 | 0.2 | No decomposition (FIG. 15) |
| 12 | Chlorobenzene (400 ppm) | 200 | 0.2 | Full decomposition of the contaminant after 16 minutes (FIG. 16) |
| 13 | Phenol (50 ppm) | 100 | 0 | Full decomposition of the contaminant after 120 minutes (FIG. 17) |
| 14 comparative | Phenol (500 ppm) | 0 | 0.2 | Transformation of phenol into phenol derivatives (FIG. 18) |
| 15 | Phenol (500 ppm) | 150 | 0.2 | During the first three hours mainly transformation into phenol derivatives is observed; then the organic compounds begin to decompose and full decomposition is reached after 300 minutes (FIG. 19) |
| 16 | Phenol (1000 ppm) | 200 | 0.5 | During the first three hours mainly transformation into phenol derivatives is observed; then the organic compounds begin to decompose and full decomposition is reached after 540 minutes (FIG. 20) |

Comparative Examples 11 and 14 illustrate that hydrogen peroxide alone is unable to promote the oxidation of the organic compound. The results shown in Examples 10, 11 and 12 demonstrate that the combination of the bismuth oxyhalide and hydrogen peroxide exhibits a synergistic effect.

Example 17

Water Purification: Decomposition of Organic Contaminants in Aqueous Medium in the Presence of the Compound of the Invention Under Light Irradiation The $Bi^{(0)}$-doped BiOCl compound of Example 1 was tested for its ability to purify water contaminated with chlorobenzene. The tested sample consisted of 200 ml aqueous solution which contains chlorobeneze (400 ppm) and the compound of Example 1 (200 mg). The sample was exposed to light irradiation as set out in previous examples, and the progressively reduced amount of the organic compound present in the sample was indirectly evaluated by periodically measuring the Chemical Oxygen Demand (COD). The time intervals at which the COD was measured and COD values are tabulated in Table 2.

TABLE 2

| Irradiation time (min) | COD (ppm) |
|---|---|
| 0 | 200 |
| 4 | 60 |
| 8 | 50 |
| 20 | <30 |
| 30 | <30 |

The COD test is in line with the UV spectroscopy analysis reported in the foregoing examples: both methods indicate that the compound of the invention is highly effective in decontaminating water contaminated with chlorobeneze.

Examples 18-20

Water Purification: Decomposition of Organic Contaminants in Aqueous Medium in the Presence of the Compound of the Invention Under Light Irradiation The $Bi^{(0)}$doped-$BiOCl_{0.875}Br_{0.125}$ compound of Example 4 was tested for its ability to purify water contaminated with mixtures of organic compounds. The tested sample consisted of 200 ml aqueous solution which contains the organic contaminants as tabulated in Table 3 below and the compound of Example 4 (150 mg). The pH of the sample was approximately 5. The sample was exposed to light irradiation at wavelength 385-740 nm. Light intensity was 70 mW/cm² and the lamp was located at a distance of 10 cm from the sample.

The catalytic activity of the $Bi^{(0)}$-doped $BiOCl_{0.875}Br_{0.125}$ compound of Example 4 is evaluated by determining the time needed in order to reduce the initial TOC value of the tested sample to a final level of about 10 ppm (TOC indicates the amount of carbon bound to organic compounds and hence serves as a measure for water quality). The relevant details of this set of experiments and results are tabulated in Table 3.

TABLE 3

| Ex. | Contaminant | Initial TOC (ppm) | Final TOC (ppm) | Irradiation time (min) |
|---|---|---|---|---|
| 18 | Phenol (50 ppm) | 38 | 6 | 80 |
| 19 | Chlorobenzene (50 ppm) + Phenol (50 ppm) | 70 | 11 | 60 |
| 20 | Chlorobenzene (50 ppm) + Dimethyl acetamide (100 ppm) | 87 | 8 | 60 |

Examples 21-23

Water Purification: Decomposition of Organic Contaminants in Aqueous Medium in the Presence of the Compound of the Invention Under Visible Light Irradiation The compounds of Examples 5, 6 and 7 were tested for their ability to purify water contaminated with organic pollutants. The experiments were carried out in a 250 mL cylindrical-shaped glass vessel at room temperature under air and at a neutral pH. The tested catalyst (200 mg) was suspended in water (200 ml). The sample further contains the organic contaminant as tabulated in Table 4 (the mixture was stirred in the dark for about 1 hour followed by filtration and measurement of adsorbed molecules by UV).

The sample was exposed to light irradiation at wavelength 385-740 nm. For visible light irradiation, a 422 nm cut-off filter was used. 300 W Xe arc lam (Max-302, Asahi Spectra) was used as the light source. Light intensity was 70 mW/cm² and the lamp was located at a distance of 10 cm from the sample. Experimental details are set out in Table 4.

TABLE 4

| Example | Catalyst | Pollutant [concentration] | Light Irradiation (wavelength) |
|---|---|---|---|
| 21 | $Bi^0$ doped-$BiOCl_{0.875}Br_{0.125}$ of Example 5 | Toluene [470 ppm] | 420-740 nm |
| 22 | $Bi^0$ doped-$BiOCl_{0.875}Br_{0.125}$ of Example 6 | MB [10 ppm] | 385-740 nm |
| 23 | $Bi^0$ doped-BiOBr of Example 7 | Carbamazepine [60 ppm] | 420-740 nm |

Figure 21:
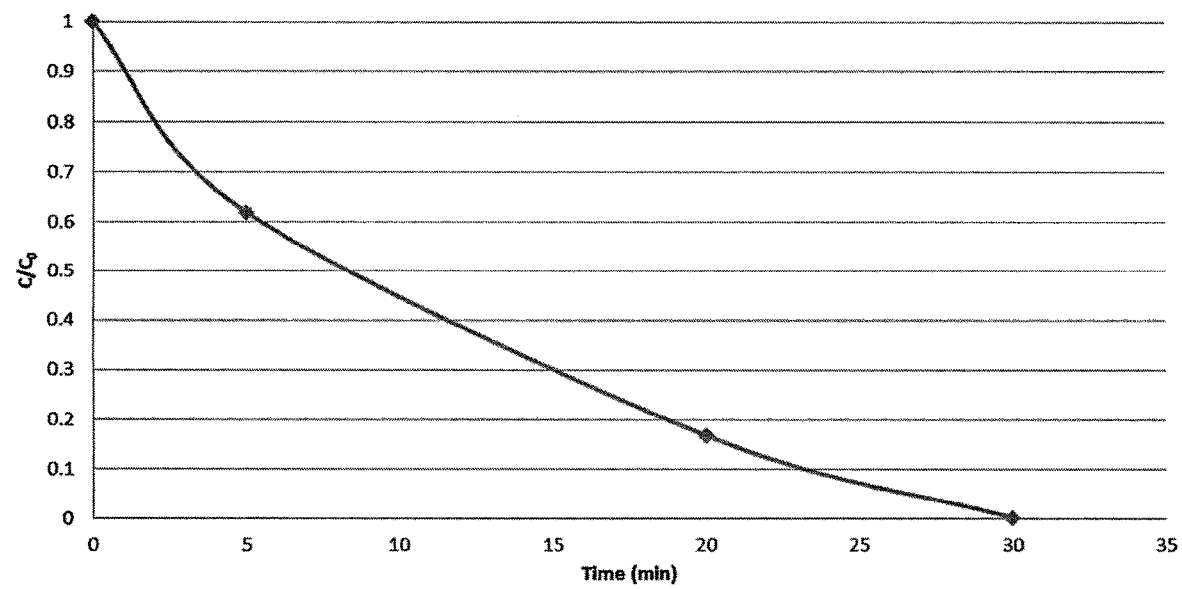
FIG. 21 presents $C/C_0$ plot versus time, illustrating the degradation of toluene in an aqueous medium in the presence of the compound of the invention under light irradiation.
Figure 22:
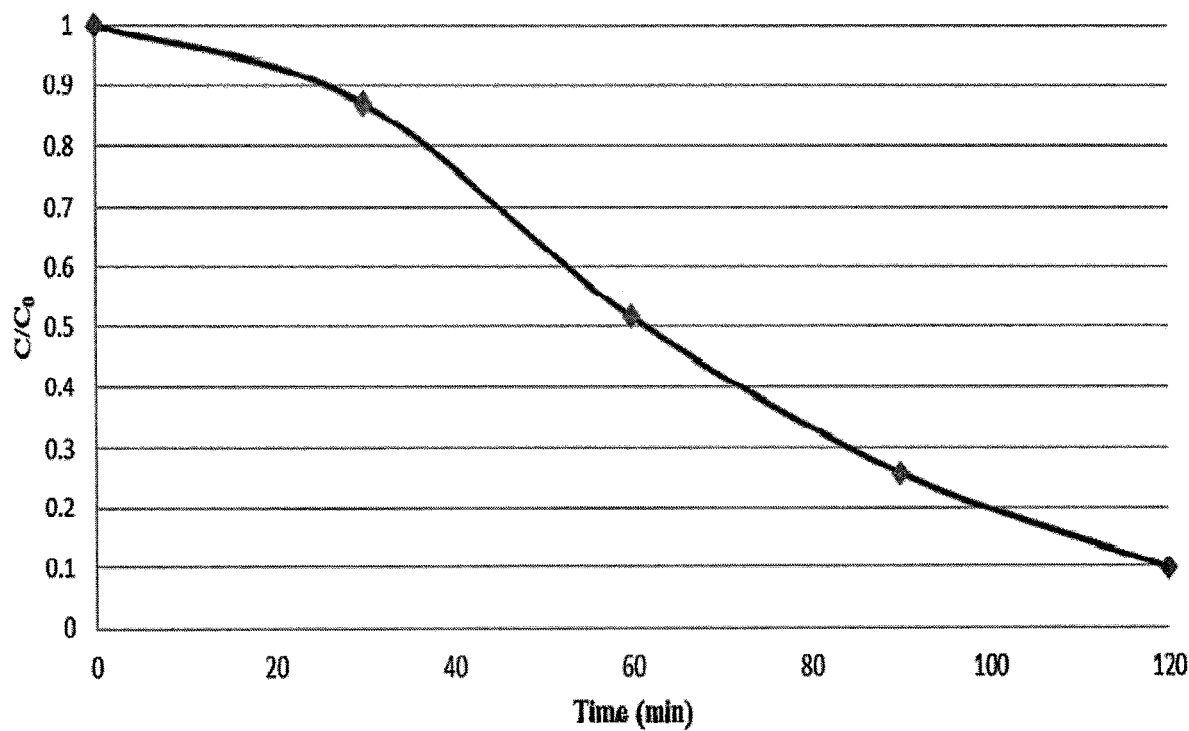
FIG. 22 is $C/C_0$ plot versus time, illustrating the degradation of methyl blue (MB) in water in the presence of a compound of the invention under light irradiation.
Figure 23:
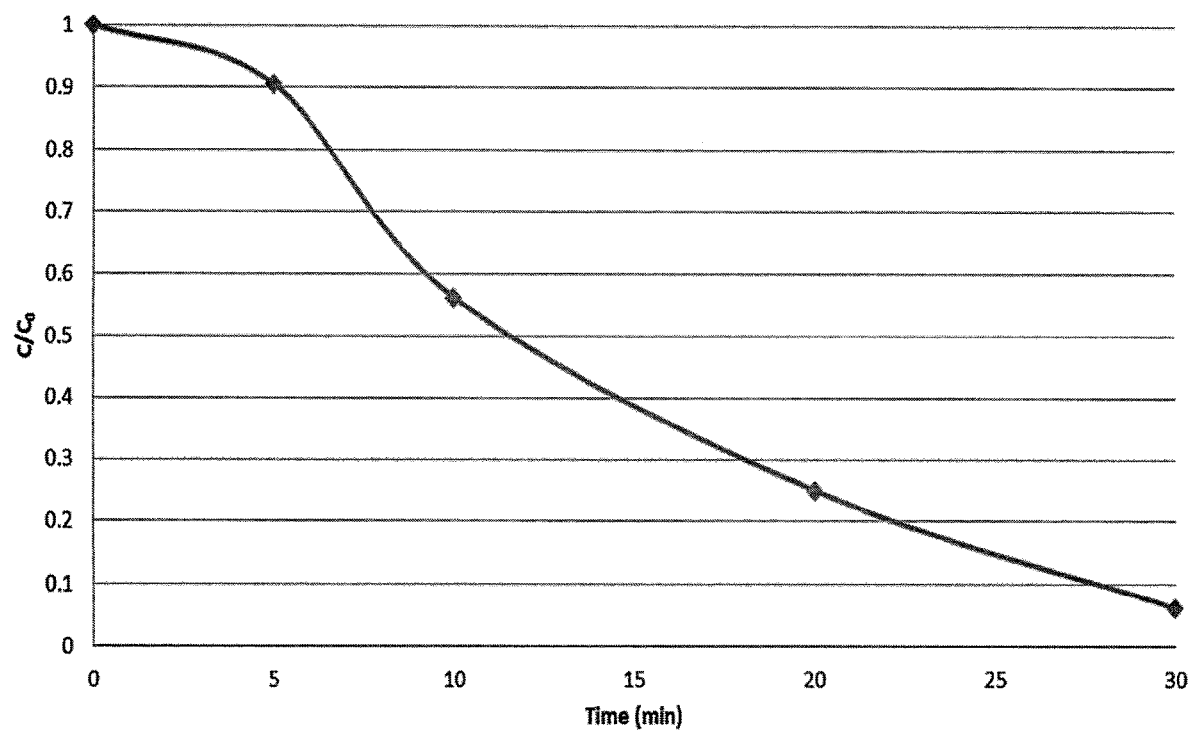
FIG. 23 presents $C/C_0$ plot versus time, illustrating the degradation of carbamazepine in an aqueous medium in the presence of the compound of the invention under light irradiation.

The sample was periodically tested to determine the concentration of the remnant organic pollutant. To this end, 5 ml aliquots were periodically taken from the sample and centrifuged at 6000 rpm for ten minutes to remove the catalyst particles (in Examples 21 and 23, the aliquots were taken at t=0 min, 5 min, 20 min and 30 min and in Example 22, aliquots were taken at t=0 min, 30 min, 60 min, 90 min and 120 min). UV absorption spectra of the pollutant in the aliquot were recorded. In order to illustrate the decrease of the concentration of the pollutant with the passage of time, the ratio $C_t/C_0$ was plotted as a function of time. FIGS. 21 to 23 show the plots generated for Examples 21 to 23, respectively. The concentration of the pollutant drops sharply in the presence of the $Bi^0$ doped-catalyst of the invention under light irradiation.

Example 24 (Comparative) and 25 (of the Invention)

The activity of the $BiOCl_{0.875}Br_{0.125}$ photocatalyst disclosed in Example 5 of WO 2012/066545 was compared with that of the $Bi^{(0)}$doped-$BiOCl_{0.875}Br_{0.125}$ compound of Example 4 (supra). The photocatalysts were tested for their ability to reduce phenol pollution in water, in response to light irradiation. Two separate samples were prepared according to the experimental conditions set forth in respect to Example 18 (Example 25 corresponds to Example 18). The TOC values of the two samples were measured periodically and the results are tabulated below, showing the reduction in the TOC of the aqueous solution with the passage of time.

TABLE 5

| Time* (min) | Example 24 (comparative) $BiOCl_{0.875}Br_{0.125}$ of WO 2012/066545 TOC (ppm) | Example 25 (of the invention) $Bi^{(0)}$ doped-$BiOCl_{0.875}Br_{0.125}$ TOC (ppm) |
|---|---|---|
| 0 | 38 | 38 |
| 10 | 36 | 31 |
| 20 | 35 | 23 |
| 40 | 33 | 19 |
| 60 | 30 | 11 |
| 80 | 29 | 6 |

*Time elapsed from the beginning of irradiation

The results shown in Table 5 demonstrate that the presence of bismuth metal dopant in the catalyst accounts for stronger photocatalytic activity, allowing rapid and effective destruction of phenol pollutant in water.

Example 26

Thin Film Formulation $Bi^3$%-Containing Adhesive Solution

Tetraethyl orthosilicate (TEOS; 5.2 gram), de-ionized water (2.7 gram) and ethanol (6 gram) were mixed together in the presence of nitric acid (pH=2) at 60° C. for 20 minutes. Pluronic P123 (0.15 gram) and poly vinyl alcohol (0.18 gram), both dissolved in 4 gram of ethanol were then added and the stirring continued for an additional hour at 60° C. to form the "glue" solution siloxane. Bismuth nitrate (0.0066 mole) is then added to the siloxane solution and the resultant mixture is vigorously mixed using homogenizer to form homogeneous blend.

Halide-Containing Solution

In case of BiOCl Film: CTAC aqueous solution (8.53 g of 25 wt % solution) is placed in a spraying device.

In case of BiOBr Film: CTAB ethanol solution (2.43 g of CTAB dissolved in 12 ml of EtOH) is placed in a spraying device.

Coating Procedure

Microscope glass slides were carefully cleaned using acid piranha (a 3:1 mixture of sulfuric acid and hydrogen peroxide). Then, the slide is immersed in the $Bi^3$%-containing solution and dip coated, followed by spraying the halide-containing solution onto the coated glass slide. In order to achieve a full removal of the organic residues from the final film, and for a better adhesion of the siloxane matrix, a calcinations step is applied. To this end, the slide is placed in an oven at room temperature. The temperature of the oven is increased gradually at a rate of 3 degrees per minute up to a temperature of 400° C. The slide is held in the oven at 400° C. for four hours and is then cooled down to room temperature. A thin uniform film is obtained, in which the catalyst is affixed onto the surface of the glass slide.

The invention claimed is:

1. A process for the preparation of bismuth oxyhalide, comprising combining at least one bismuth salt and at least one halide source in an acidic aqueous medium in the presence of a reducing agent, and isolating a precipitate formed, wherein the so-formed bismuth oxyhalide is doped with elemental bismuth $Bi^{(0)}$, wherein the so-formed bismuth oxyhalide is doped with elemental bismuth $Bi^{(0)}$ at a doping level of not more than 7 molar %, relative to the total amount of the bismuth.

2. A process according to claim 1, wherein the halide source is an organic halide salt.

3. A process according to claim 2, wherein the organic halide salt is selected from the group consisting of quaternary ammonium salts represented by the formulas $N^+R_1R_2R_3R_4C^-$, $N^+R_1R_2R_3R_4Br^-$ and their mixture, wherein $R_1$, $R_2$, $R_3$ and $R_4$ are alkyl groups, which may be the same or different.

4. A process according to claim 1, wherein the reducing agent comprises hydride.

5. A process according to claim 4, wherein the reducing agent is borohydride.

6. A process according to claim 1, wherein the acidic aqueous medium comprises an organic acid.

7. A process according to claim 1, wherein the bismuth oxyhalide is selected from the group consisting of BiOCl, BiOBr and $BiOCl_yBr_{1-y}$ wherein y is in the range from 0.5 to 0.95.

8. A process according to claim 7, wherein the bismuth oxyhalide is $BiOCl_yBr_{1-y}$ wherein y is in the range from 0.6 to 0.95.

9. A process according to claim 1, wherein the bismuth oxyhalide is selected from the group consisting of:
   $Bi^{(0)}$doped-BiOCl;
   $Bi^{(0)}$doped-BiOBr; and
   $Bi^{(0)}$doped-$BiOCl_yBr_{1-y}$ wherein y is in the range from 0.5 to 0.95.

10. A process according to claim 1, wherein the doping level of Bi(0) is from 0.1 to 3 molar %.

11. A process for the preparation of bismuth oxyhalide, comprising combining at least one bismuth salt and at least one halide source in an acidic aqueous medium in the presence of a reducing agent, and isolating a precipitate formed, wherein the so-formed bismuth oxyhalide is doped with elemental bismuth $Bi^{(0)}$, wherein the halide source is an organic halide salt.

12. A process for the preparation of bismuth oxyhalide, comprising combining at least one bismuth salt and at least one halide source in an acidic aqueous medium in the presence of a reducing agent, and isolating a precipitate formed, wherein the so-formed bismuth oxyhalide is doped with elemental bismuth $Bi^{(0)}$, wherein the reducing agent comprises hydride.

* * * * *